(12) United States Patent
Kwak et al.

(10) Patent No.: US 8,445,610 B2
(45) Date of Patent: May 21, 2013

(54) CONTROLLED RADICAL POLYMERIZATION PROCESSES

(75) Inventors: Yungwan Kwak, Breinigsville, PA (US);
Renaud Nicolay, Montrouge (FR);
Krzysztof Matyjaszewski, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 90 days.

(21) Appl. No.: 12/921,296

(22) PCT Filed: Mar. 6, 2009

(86) PCT No.: PCT/US2009/036377
§ 371 (c)(1),
(2), (4) Date: Nov. 4, 2010

(87) PCT Pub. No.: WO2009/111725
PCT Pub. Date: Sep. 11, 2009

(65) Prior Publication Data
US 2011/0046324 A1  Feb. 24, 2011

Related U.S. Application Data

(60) Provisional application No. 61/068,604, filed on Mar. 7, 2008.

(51) Int. Cl.
*C08F 2/00* (2006.01)
*C08F 4/00* (2006.01)
*C08F 4/44* (2006.01)

(52) U.S. Cl.
USPC ............. 526/222; 526/90; 558/235; 558/245; 560/9

(58) Field of Classification Search
USPC ................. 526/222, 217, 317.1, 90; 558/235, 558/245; 560/9
See application file for complete search history.

(56) References Cited

U.S. PATENT DOCUMENTS

| | | |
|---|---|---|
| 2003/0004293 A1 | 1/2003 | Dvornic et al. |
| 2007/0155926 A1 | 7/2007 | Matyjaszewski et al. |
| 2007/0167571 A1 | 7/2007 | Lai |

OTHER PUBLICATIONS

Kabachii et al. Polymer Science, Ser.B, 48(1-2), 32-36 (2006).*
Zhang et al. Journal of Polymer Science: Part A: polymer Chemistry, 44, 510-518 (2006).*
Zhang et al. Journal of Applied Polymer Science, 106, 230-237(2007).*
Wager et al. European Polymer Journal, 40, 641-645(2004).*
PCT International Search Report for International Application No. PCT/US09/36377, mailed Apr. 20, 2009.
EPO Supplemental European Search Report for European Application No. 09718495.1, mailed Sep. 21, 2011.
Nicolay et al., "Dibromotrithiocarbonate Iniferter for Concurrent ATRP and RAFT Polymerization. Effect of Monomer, Catalyst, and Chain Transfer Agent Structure on the Polymerization Mechanism," *Macromolecules*, 2008, 41, 4585-4596.
Nicolay et al., "Synthesis of poly(vinyl acetate) block copolymers by successive RAFT and ATRP with a bromoxanthate iniferter," *Chem. Commun.*, 2008, 5336-5338.
Kwak, et al., "Effect of Initiator and Ligand Structures on ATRP of Styrene and Methyl Metacrylate Initiated by Alkyl Dithiocarbamate," *Macromolecules*, 2008, 41, 6627-6635.
Kwak, et al., "Concurrent ATRP/RAFT of Strene and Methyl Methacrylate with Dithioesters Catalyzed by Copper(I) Complexes," *Macromolecules*, 2008, 41, 6602-6604.
Wager et al., "A simple method to convert atom transfer radical polymerization (ATRP) Initiators into reversible addition fragmentation chain-transfer (RAFT) mediators." *Eur. Polym. J.*, 2004, 40, 641-645.
Kabachii, et al., "Dithioesters in Atom-Transfer Radical Polymerization," *Polym. Sci, Ser. B*, 2006, 48, 32-36.
Zhang, et al., "Atom Transfer Radical Polymerizations of Methyl Methacrylate and Styrene with an Iniferter Reagent as the Initiator," *J. Appl. Polym. Sci.*, 2007, 106, 230-237.
Zhang, et al., "Synthesis of Well-Defined Naphthalene and Photolabile Group-Labeled Polystyrene via ATRP," *J. Polym. Sci.: Part A: Polym. Chem.*, 2006, 44, 510-518.

* cited by examiner

Primary Examiner — Ling Choi
Assistant Examiner — Chun-Cheng Wang
(74) Attorney, Agent, or Firm — K&L Gates LLP

(57) ABSTRACT

A transition metal mediated chain transfer agent controlled polymerization process is described. The process combines the advantages of atom transfer radical polymerization (ATRP) and reversible addition fragmentation transfer (RAFT) polymerization. Synthesis of chain transfer agents useful in the disclosed processes is also disclosed. Other improvements on ATRP RAFT processes are also described.

11 Claims, 6 Drawing Sheets

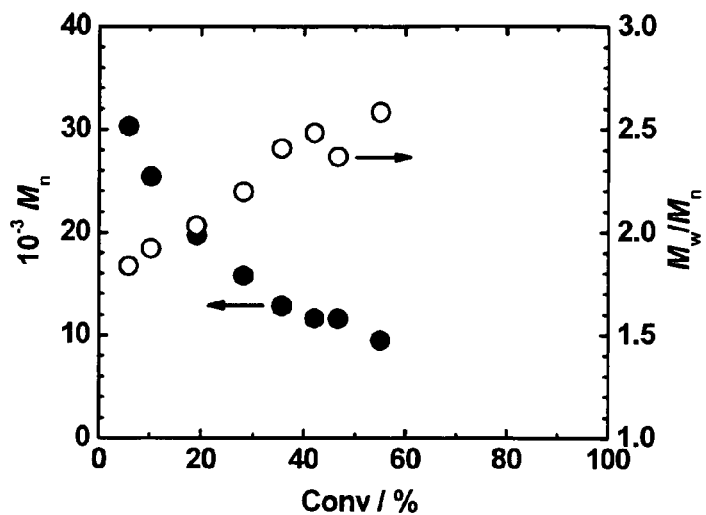
Figure 3
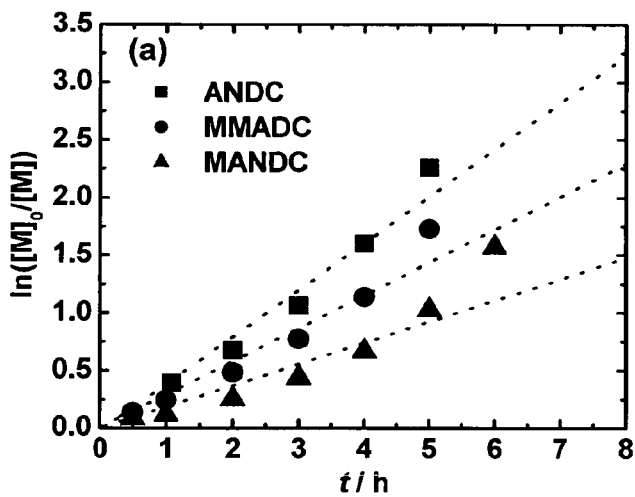
4a)
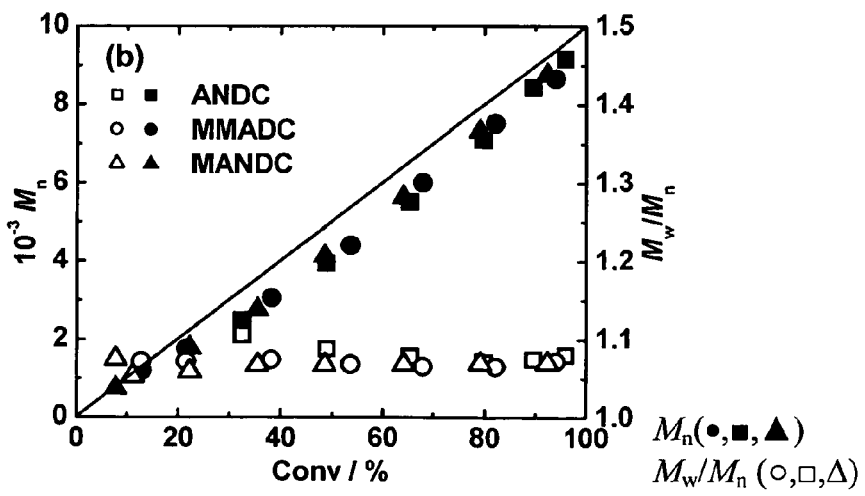
4b)
Figures 4(a) and 4(b)

5(a)

5(b)

$M_n$ (●,■), $M_w/M_n$ (○,□)

CONTROLLED RADICAL POLYMERIZATION PROCESSES

CROSS REFERENCE TO RELATED APPLICATIONS

This application is a U.S. nationalization of PCT International Application No. PCT/US2009/36377, having an international filing date of Mar. 6, 2009, which claims the priority benefit of U.S. Provisional Application Ser. No. 61/068,604 filed Mar. 7, 2008, the disclosures of each of which are incorporated herein by this reference.

STATEMENT REGARDING GOVERNMENT SUPPORT

This invention was made in part with support by the National Science Foundation (CHE-07-15494). The government has certain rights in this invention.

TECHNICAL FIELD OF THE INVENTION

The scope of atom transfer radical polymerization (ATRP) and reversible addition fragmentation transfer (RAFT) polymerization is extended by the development of transition metal mediated chain transfer agent (CTA) polymerization combining the advantages of both procedures and providing a simple procedure for preparation of the control agents.

BACKGROUND

"Controlled/living" radical polymerization (CRP) became one of the robust and powerful techniques for polymer synthesis, during the past decade. CRP can be achieved by creation of a dynamic equilibrium between a dormant species and propagating radicals via reversible deactivation or chain transfer procedures. This goal can be achieved by several recently developed controlled polymerization techniques available for review at [http://www.chem.cmu.edu/groups/maty/about/research/02.html] which include stable free-radical polymerization (SFRP) predominately nitroxide mediated polymerization (NMP), atom transfer radical polymerization (ATRP), reversible addition-fragmentation chain transfer polymerization (RAFT), and Te, Sb, and Bi-mediate polymerization, reversible chain transfer catalyzed polymerization.

Since CRP processes generally provide compositionally homogeneous well-defined polymers (with predictable molecular weight, narrow molecular weight distribution, and high degree of chain end-functionalization) they have been the subject of much study. Progress in the different CRP procedures has been reported in several review articles, (ATRP) (See Matyjaszewski, K. *ACS Symp. Ser.* 1998, 685, 258-283; Matyjaszewski, K. *ACS Symp. Ser.* 2000, 768, 2-26; Qiu, J.; Charleux, B.; Matyjaszewski, K. *Prog. Polym. Sci.* 2001, 26, 2083-2134; Davis, K. A.; Matyjaszewski, K. *Advances in Polymer Science* 2002, 159, 2-166) nitroxide mediated polymerization (NMP), (See Hawker, C. J.; Bosman, A. W.; Harth, E. *Chem. Rev.* 2001, 101, 3661-3688) reversible addition fragmentation chain transfer (RAFT) (See Chiefari, J.; Chong, Y. K.; Ercole, F.; Krstina, J.; Jeffery, J.; Le, T. P. T.; Mayadunne, R. T. A.; Meijs, G. F.; Moad, C. L.; Moad, G.; Rizzardo, E.; Thang, S. H. *Macromolecules* 1998, 31, 5559-5562;Chiefari, J.; Rizzardo, E. In *Handbook of Radical Polymerization;* Matyjaszewski, K.; Davis, T. P., Eds.; Wiley-Interscience: Hoboken, 2002; pp 629-690; Moad, G.; Rizzardo, E.; Thang, S. H. *Australian Journal of Chemistry* 2005, 58, 379-410) and catalytic chain transfer (CCT) (See Gridnev, A. A.; Ittel, S. D. *Chemical Reviews* 2001, 101, 3611-3659.)

Each CRP process provides some advantages over the other procedures. One of the advantages of RAFT is that it can polymerize a broader range of radically copolymerizable monomers than NMP or ATRP under conditions typical of a standard free radical polymerization. Most of (conjugated and non-conjugated) vinyl monomers can be polymerized by this method. Various dithioesters, dithiocarbamates, trithiocarbonates and substituted xanthates (See Quiclet-Sire, B.; Zard, S. Z. *Topics in Current Chemistry* 2006, 264, 201-236) have been effectively used as transfer agents to control molecular weight, molecular weight distribution, and molecular architecture of polymeric materials prepared from a wide range of monomers. The simplified mechanism involves, in addition to initiation, propagation, and termination, typical of a conventional radical polymerization, a series of reversible addition-fragmentation chain transfer steps between the CTA and a radical. (See Chiefari, J.; Chong, Y. K.; Ercole, F.; Krstina, J.; Jeffery, J.; Le, T. P. T.; Mayadunne, R. T. A.; Meijs, G. F.; Moad, C. L.; Moad, G.; Rizzardo, E.; Thang, S. H. *Macromolecules* 1998, 31, 5559-5562; Goto, A.; Fukuda, T. *Progress in Polymer Science* 2004, 29, 329-385.) The exchange reaction process repeats itself many times so that every chain has a similar chance to grow. One limitation of RAFT polymerization is that the procedure requires the presence of a conventional radical initiator or other source of radicals such as peroxides or percarbonates in addition to a monomer and a chain transfer agent (CTA) in the reaction medium the final product contains a low fraction of radical initiated polymers. A need therefore exists for a manner to prepare materials with lower fractions of side products. Another limitation of RAFT and MADIX controlled transfer polymerization processes are that there is no universal transfer agent and many different transfer agents have to be prepared to optimally polymerize the full spectrum of radically copolymerizable monomers. Furthermore there was no universal efficient procedure to prepare the desired transfer agents.

Matyjaszewski and coworkers disclosed the fundamental four component Atom Transfer Radical Polymerization (ATRP) process comprising the addition, or in situ formation, of an initiator, in this case a molecule with a transferable atom or group that is completely incorporated into the final product, a transition metal and a ligand that form, a partially soluble transition metal complex that participates in a reversible redox reaction with the added initiator or a dormant polymer to form the active species to copolymerize radically polymerizable monomers, and a number of improvements to the basic ATRP process, in a number of commonly assigned patents and patent applications: U.S. Pat. Nos. 5,763,546; 5,807,937; 5,789,487; 5,945,491; 6,111,022; 6,121,371; 6,124,411; 6,162,882; 6,624,262; 6,407,187; 6,512,060; 6,538,091; 6,541,580; 6,624,262 ; 6,627,314; 6,759,491 ; 6,790,919; 6,887,962; 7,019,082; 7,049,373; 7,064,166; 7,125,938 ; 7,157,530; 7.332,550 and U.S. patent application Ser. Nos. 09/534,827; PCT/US04/09905; PCT/US05/007264; PCT/US05/007265; PCT/US06/33152; PCT/US2006/048656 and PCT/US08/64710, all of which are herein incorporated by reference.

ATRP is the most efficient CRP methods for the preparation of pure segmented copolymers, since it does not require addition of a radical initiator to continuously form new polymer chains, allowing the synthesis of novel multi-segmented copolymers with a predetermined degree of polymerization, low molecular weight distribution ($M_w/M_n$), incorporating a wide range of functional monomers and displaying controllable macromolecular structures under mild reaction conditions. ATRP generally requires addition of formation or an alkyl halide or (pseudo)halide as an initiator (R—X) or dormant polymer chain end ($P_n$—X), and a partially soluble transition metal complex (Cu, Fe or Ru, for example) capable of undergoing a redox reaction as a catalyst. As shown in Scheme 1 ATRP involves homolytic cleavage of the $P_n$—X bond by a transition metal complex ($Cu^1$—X/L) (with a rate constant $k_{act}$), followed by propagation (with rate constant $k_p$) and reversible deactivation of the propagating chain radical ($P_n$*) (with a rate constant $k_{deact}$) by repetitive transfer of the halogen or pseudo-halogen atom from and to the transition metal complex. The polymer grows by insertion of the monomer(s) present in the reaction medium between the $P_n$— and —X bond.

Scheme 1: Proposed Mechanism of an ATRP Reaction

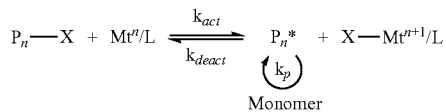

Iniferter polymerization, which was disclosed in 1982 by Otsu and coworkers, (See Otsu, T.; Yoshida, M.; Tazaki, T. *Makromol. Chem., Rapid Commun.* 1982, 3, 133-140; Otsu, T.; Yoshida, M.; Kuriyama, A. *Polym. Bull.* 1982, 7, 45-50) was one of the earliest attempts to develop a CRP technique. Suitable iniferters developed in the next two decades included diphenyl disulfide, tetraethylthiuram disulfide, benzyl diethyldithiocarbamate and 2-phenylethyl diethyldithiocarbamate. The propagating polymer chain end was always the $Et_2NCSS$— group, which can photo-dissociate into a reactive propagating radical and a less reactive small radical $Et_2NCSS$* resulting in successive insertion of monomers into the dissociated bond. However, the structures and compositions of the polymers were poorly controlled and the polymers displayed relatively high polydispersity (PDI).

Some improvements in iniferter polymerization were made in the presence of copper catalyst. When the reverse ATRP of methyl methacrylate (MMA) was carried out in the presence of copper(II) N,N-diethyldithiocarbamate, poly(methyl methacrylate) (PMMA) with relatively narrow molecular weight distribution was obtained but the initiation efficiency was low and a large amount of radical initiator was used, resulting in a high level of chain termination. (See Li, P.; Qiu, K.-Y. *Journal of Polymer Science, Part A: Polymer Chemistry* 2002, 40, 2093-2097; Li, P.; Qiu, K.-Y. *Living and Controlled Polymerization: Synthesis, Characterization and Properties of the Respective Polymers and Copolymers* 2006, 39-50.) Also, when normal ATRP of MMA and styrene (St) was initiated by ethyl 2-N,N-(diethylamino)dithiocarbamoyl-butyrate and (1-naphthyl)-methyl N,N-diethyldithiocarbamate, low initiation efficiency and relatively low molecular weight PMMA and polystyrene (PSt) were formed. (See Zhang, W.; Zhu, X.; Zhu, J.; Chen, J. *Journal of Polymer Science, Part A: Polymer Chemistry* 2005, 44, 32-41.)

As discussed below these prior art ATRP/dithiocarbamate systems do not comprise transfer agents with the preferred structure selected for each monomer as disclosed herein nor when employed as ATRP initiators form polymers with targeted high molecular weight.

There are examples of using photo-initiated polymerization in free radical polymerization but there are only a few reports in which light is utilized for CRP. One of those examples is iniferter polymerization. Nevertheless, as noted above many of polymers prepared by the iniferter technique showed high polydispersity, poor initiation efficiency, and much higher molecular weight (MW) than theoretical values. The other polymerization process where a few cases of photo-initiation was examined is RAFT polymerization and these examples also realized only limited success. (See Lu, L.; Zhang, H.; Yang, N.; Cai, Y. *Macromolecules* 2006, 39, 3770-3776.)

Therefore, as disclosed in one embodiment of the invention, developing polymerization methods which adopt the advantages of photo-iniferter and ATRP (or other CRP procedures) will bring variety of options for designing novel polymeric materials. Particularly, precise photo-patterning of materials on a substrate can be conducted in a much simpler way by photoinitiated polymerization of polymers with desired properties from precisely defined photo-stimulated areas using the novel technique disclosed.

As noted above RAFT polymerizations process require a continuous supply of new initiating radicals by the decomposition of radical initiators ($I_2$ in Scheme 2), such as AIBN, to activate the process and to compensate for radical/radical chain termination between propagating radicals. During the first stages of the polymerization the RAFT agent (ZC=SSR) is consumed by propagating radicals by an addition-fragmentation mechanism. The fragmented radical (R.) reinitiates polymerization, resulting in new propagating radicals which then take part in the equilibrium established between the dormant polymer and active chains.

Scheme 2: Representation of the mechanism of a RAFT polymerization.

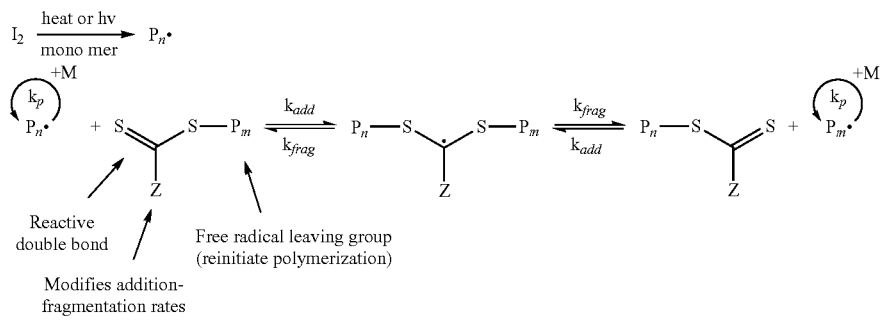

However since the radical initiators in the RAFT system produce new polymer chains they decrease chain end functionality. Therefore, it is difficult to prepare pure telechelic (co)polymers or pure block copolymers or high molecular weight polymers with narrow polydispersity, especially at higher radical initiator concentrations.

In one embodiment of the present invention these aforementioned problems are resolved using transition metal-catalyzed RAFT polymerization (which does not require addition of any conventional initiator) producing purer block copolymers and high molecular weight polymers in a well-controlled manner. If one focuses on the mechanism the procedure can be thought of as a transition metal mediated chain transfer agent (CTA) polymerization. As discussed below (in scheme 6) the developed procedure is also applied to formation of CTAs with a range of Z-groups and R-groups suitable for polymerization of the full spectrum of radically copolymerizable monomers as illustrated in Scheme 3. (See Moad, G.; Rizzardo, E.; Thang, S. H. *Acc. Chem. Res.* 2008, 41, 1133-1142.) The procedure is readily adaptable to form multi-functional transfer agents for preparation ABA and $(AB)_n$ star copolymers.

ered to be closely linked as comprising a transition metal mediated degenerative chain transfer polymerization. The selection of the R-group should take into account the stability of the dormant species and the rate of addition of R. to a given monomer. The order of R-group leaving ability reflects the importance of both steric and electronic effects. Steric effects in RAFT are much more important than in ATRP. Therefore there are differences between the functionality that should be selected for the Z-group for the agent to be employed in an "ATRP" involving appropriately selected transition metal complex transferable dithio-derivatives and a transition metal mediated "RAFT" polymerization. In an "ATRP" a secondary 2-bromopropionitrile is more reactive than tertiary 2-bromoisobutyrate while in a "RAFT" polymerization it is the reverse situation.

Suitable transfer agents with a range of Z- and —R functional groups have been detailed in WO 98/01478 and WO/9858974, including U.S. Pat. No. 6,153,705, and in recent review articles (See Quiclet-Sire, B.; Zard, S. Z. *Topics in Current Chemistry* 2006, 264, 201-236; Moad, G.; Riz-

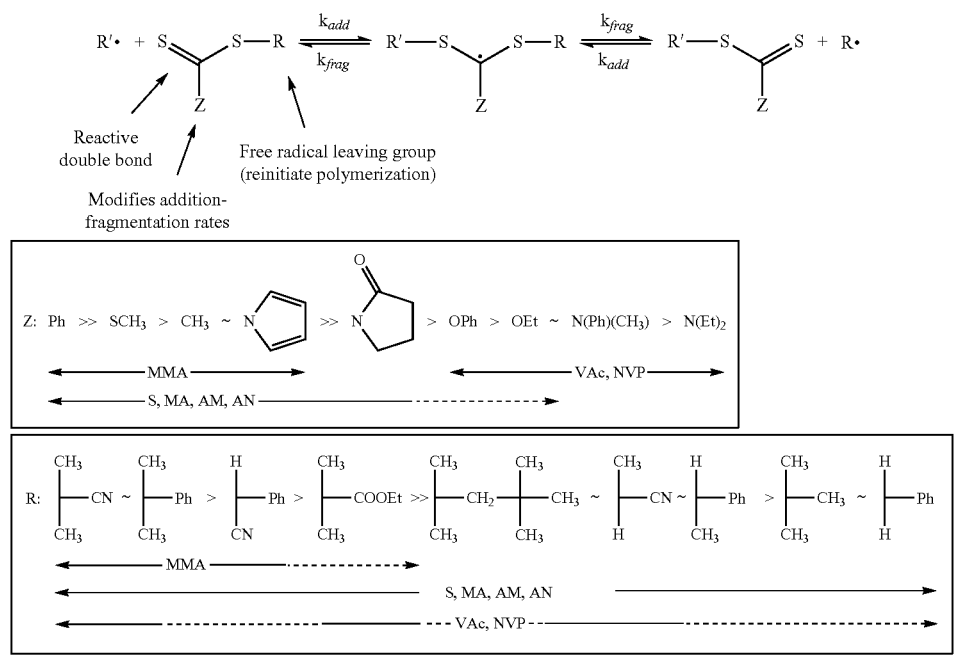

Z-addition rates decrease and fragmentation rates increase from left to right whereas for R-fragmentation rates decrease from left to right. Stabilizing Z groups such as -Ph and -Me are efficient in styrene and methacrylate polymerization, but they retard polymerization of acrylates and inhibit polymerization of vinyl esters. Weakly stabilizing groups, such as —NR$_2$ in dithiocarbamates or —OR in xanthates, are good for vinyl esters, vinyl pyrrolidones (NVP) and vinyl carbazoles (NVC) but inefficient for styrene. Therefore for activation of CTAs by Cu complexes, while R groups as reactive as, or more reactive than styryl should work the proper selection of the Z- and R-groups of the CTA as well as the appropriate selection of a monomer for a particular CTA is a determinant for a successful transition metal mediated RAFT polymerization and ATRP involving appropriately selected transition metal complex transferable dithio-derivatives as initiators. Indeed this combination of CRP procedures could be considzardo, E.; Thang, S. H. *Polymer* 2008, 49, 1079-1131; Taton, D.; Destarac, M.; Zard, S. Z. Title: *Handbook of RAFT Polymerization* 2008, 373-421) which are hereby incorporated to illustrate the range of Z- and —R functional groups that can be selected for this novel transition metal mediated chain transfer agent polymerization.

Currently RAFT agents are synthesized in moderate-to-excellent yields by several methods:

(1) Reaction of a carbodithioate salt with an alkylating agent. (See Chong, Y. K.; Krstina, J.; Le, T. P. T.; Moad, G.; Postma, A.; Rizzardo, E.; Thang, S. H. *Macromolecules* 2003, 36, 2256-2272; Chiefari, J.; Mayadunne, R. T. A.; Moad, C. L.; Moad, G.; Rizzardo, E.; Postma, A.; Skidmore, M. A.; Thang, S. H. *Macromolecules* 2003, 36, 2273-2283; Le, T. P.; Moad, G.; Rizzardo, E.; Thang, S. H. In *PCT Int. Appl.*; (E.I. Du Pont De Nemours and Co., USA; Le, Tam Phuong; Moad, Graeme; Rizzardo, Ezio; Thang, San Hoa). WO1998/01478, 1998; p 88 pp.)

(2) Addition of a dithio acid across an olefinic double bond. (See Chong, Y. K.; Krstina, J.; Le, T. P. T.; Moad, G.; Postma, A.; Rizzardo, E.; Thang, S. H. *Macromolecules* 2003, 36, 2256-2272.)

(3) Radical-induced decomposition of a bis(thioacyl) disulfide. (See Rizzardo, E.; Thang, S. H.; Moad, G. In PCT Int. Appl.; (Commonwealth Scientific and Industrial Research Organisation, Australia; E.I. Du Pont De Nemours and Company). WO 99/05099, 1999; p 40 pp.)

(4) Sulfuration of a thioloester, (See Chong, Y. K.; Krstina, J.; Le, T. P. T.; Moad, G.; Postma, A.; Rizzardo, E.; Thang, S. H. Macromolecules 2003, 36, 2256-2272; Le, T. P.; Moad, G.; Rizzardo, E.; Thang, S. H. In PCT Int. Appl.; (E.I. Du Pont De Nemours and Co., USA; Le, Tam Phuong; Moad, Graeme; Rizzardo, Ezio; Thang, San Hoa). WO1998/01478, 1998; p 88 pp.) a carboxylic acid with an alcohol, and treatment of carboxylic acid with P4S10.

(5) Radical-induced ester exchange. (See Chong, Y. K.; Krstina, J.; Le, T. P. T.; Moad, G.; Postma, A.; Rizzardo, E.; Thang, S. H. *Macromolecules* 2003, 36, 2256-2272.)

(6) Reaction of thiocarbonylbisimidazole with thiol or alcohol. However, all the methods reported above require a tedious purification process which adds cost to the final material.

A significant improvement would be attained if desired monomer specific mono-functional or multi-functional RAFT agents could be obtained in high yields and used directly in the polymerization reaction without any further purification.

Disclosed herein is a broadly applicable process for synthesis and use of various new iniferter/ATRP initiators containing a series of different dithiocarbamate (DC) and trithiocarbonate (TTC) structures and their successful introduction into ATRP by determining which initiators and catalyst complexes interact together to form active polymerization mediators that can produce exemplary well-defined low PDI polymers. Since the DC group can be activated by UV irradiation, this class of initiators can also be employed as photo-initiators resulting in a procedure for photo-initiated ATRP and as transfer agents in the novel disclosed transition metal initiated RAFT polymerizations.

As noted above reversible addition—fragmentation chain transfer (RAFT) polymerization is that it can be used for a wider range of functional and nonfunctional monomers. In RAFT polymerization, the activation deactivation equilibrium is a chain transfer reaction. Radicals are neither formed nor destroyed in these steps and maintain polymerization in the absence of termination reactions. However, since termination reactions are unavoidable in radical polymerization processes the RAFT process requires a constant radical source (generally from decomposition of a standard radical initiator) to maintain an active chain transfer reaction. Therefore, initiation and bimolecular termination reactions occur as in conventional radical polymerization and pure telechelic-functional copolymers are not formed.

Normal ATRP procedures do not require an added free radical initiator as in the RAFT polymerization since the first radical is formed in a redox transfer reaction with an added transition metal catalyst therefore development of a new controlled polymerization method combining aspects of RAFT and ATRP would be a process improvement of value to both procedures. In other words, if one can perform a RAFT polymerization, not by adding a radical initiator but by generating the propagating radical from the added RAFT agent itself by reaction with a transition metal catalyst, thereby allowing one to prepare purer (block)polymers this is an improvement. Similarly if one can expand the range of monomers polymerizable by transition metal mediated chain transfer agent (CTA) polymerization this is an improvement.

Embodiments of this disclosure demonstrate methodology to prepare well defined pure segmented copolymers further comprising segments incorporating non-conjugated vinyl monomers. Other embodiments allow procedures for preparation of mono- and multi-functional initiators for controlled radical polymerization reactions. Still other embodiments allow combination of ATRP and RAFT polymerization procedures in sequential or concurrent copolymerization reactions to form novel segmented copolymers and high molecular weight copolymers with site specific functionality.

BRIEF DESCRIPTION OF INVENTION

The various embodiments of the present disclosure relate to improvements on transition metal mediated controlled polymerization processes. According to certain embodiments, the present disclosure provides for a transition metal mediated controlled polymerization process comprising polymerizing radically (co)polymerizable monomer(s) in the presence of an initiator comprising substituted dithio-groups selected from the group consisting of dithioesters, dithiobenzoates, dithiocarbamates, trithiocarbonates and xanthates, substituted with various alkyl substituents, a transition metal compound; and a ligand. According to certain embodiments, the initiator comprising the substituted dithio-groups are formed by reaction of one of a dithioester disulfide, a dithiobenzoate disulfide, a dithiocarbamate disulfide, a trithiocarbonate, and a xanthate disulfide in the presence of an alkyl halide, optionally comprising functional groups, a transition metal, and a ligand. In specific embodiments the initiator comprising substituted dithio-groups additionally comprises one or more radically different transferable atoms or groups. In specific embodiments, the initiator comprising substituted dithio-groups is initially employed to conduct transition metal mediated controlled polymerization process comprising initiating the polymerization of first radically copolymerizable monomers by activating the substituted dithio-groups in the presence of a transition metal complex, and a ligand; followed by a second controlled polymerization process of one or more different monomers conducted using the one or more different radically transferable atoms or groups as the initiating functionality. In other specific embodiments, the initiator comprising one or more different radically transferable atoms or groups is initially employed to conduct transition metal mediated controlled polymerization process comprising polymerization of first radically copolymerizable monomers using the radically transferable atoms or groups as the initiating functionality in the presence of a transition metal complex, and a ligand; followed by a second transition metal mediated controlled polymerization process of one or more different monomers by activating the substituted dithio-groups to initiate the polymerization. In still other specific embodiments, the initiator comprising dithio-groups and one or more different radically transferable atoms or groups is employed to concurrently conduct a transition metal mediated controlled polymerization of first set of radically (co)polymerizable monomers wherein the radically transferable atoms or groups is the initiating functionality to conduct the transition metal mediated controlled polymerization process; and polymerization of a second set of radically (co)polymerizable monomers, wherein the substituted dithio-group is used to initiate a transition metal mediated controlled polymerization in the presence of a transition metal complex and a ligand.

Still other embodiments of the present disclosure provide for processes for the preparation of a chain transfer agent or initiator containing a dithio-group selected from dithiobenzoate, dithiocarbamate, and xanthate with various alkyl substituents. The process comprises conducting a transition metal mediated addition fragmentation reaction with one of a bis(thiobenzoyl) disulfide, a bis(ethylxanthogen) and a tetraethylthiuram disulfide in the presence of an alkyl halide and a transition metal complex capable of a conducting an activation/deactivation reaction. In certain embodiments, the reaction is conducted in the presence of a reducing agent. In other embodiments, the alkyl halide is a macromolecule. In particular embodiments where the alkyl halide is a macromolecule, the alkyl halide macromolecule is formed by a first copolymerization of radically copolymerizable monomers in the presence of a transition metal complex capable of a conducting an activation/deactivation reaction with an added alkyl halide.

Further embodiments of the present disclosure provide for controlled polymerization processes comprising polymerizing radically copolymerizable monomers in the presence of a dithio-chain transfer agent, a transition metal compound, a ligand that forms a soluble complex with the transition metal compound, and a reducing agent, wherein the final copolymer has a degree of polymerization greater than 1,000 and a polydispersity less than 1.5. In specific embodiments, the final copolymer has a degree of polymerization greater than 10,000 and a polydispersity less than 1.3.

Still further embodiments of the present disclosure provide for transition metal mediated polymerization processes comprising polymerizing radically copolymerizable monomers in the presence of a dithio-initiator comprising a dithioester group, a dithiobenzoate group or a dithiocarbamate group; a transition metal compound; and a ligand capable of at least partially solubilizing the transition metal compound and form an active catalyst to activate/deactivate the dithio-initiator and allow chain propagation. In specific embodiments involving styrene based monomers, the dithio-initiator for the transition metal mediated polymerization of styrene based monomers comprises secondary or tertiary substituents next to the sulfur atom. In other embodiments involving (meth)acrylate based monomers, the dithio-initiator for the transition metal mediated polymerization of (meth)actylate based monomers comprises tertiary substituents next to the sulfur atom.

Still other embodiments of the present disclosure provide for processes for conducting a photo-initiated transition metal mediated polymerization comprising exposing a film of a solution comprising: a dithio-initiator comprising a dithioester group, a dithiobenzoate group or a dithiocarbamate group; radically (co)polymerizable monomers; a transition metal compound; and a solubilizing ligand, to a source of electromagnetic radiation.

BRIEF DESCRIPTION OF THE FIGURES

FIG. 3: Dependence of number average molecular weight, $M_n$ (•), and polydispersity, $M_w/M_n$ (o), vs percent conversion for the bulk polymerization of styrene at 120° C.: St/MMADC=100/1.

FIGS. 4(a) and 4(b). 4(a) Kinetic plot of the bulk polymerization of styrene at 120° C. with PMDETA ligand and 4(b) Dependence of number average molecular weight, $M_n$, and polydispersity, $M_w/M_n$, vs percent conversion for the bulk polymerization of styrene at 120° C.: St/DC initiator/CuBr/PMDETA=100/1/1/1.

DETAILED DESCRIPTION

Any patent, publication, or other disclosure material, in whole or in part, that is referenced in this document is incorporated herein by such reference. However, each reference is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

A series of new radically transferable groups for conducting a controlled ATRP are described. The new initiators are based on alkyl dithiocarbamates (DC) and trithiocarbonates (TTC). When an ATRP is conducted with these new radically transferable groups in the presence of an exemplary copper based ATRP catalyst no exchange reactions occur between the various dialkyldithiocarbamate initiators and halogen in the copper catalyst. That is, the copper/ligand complex clearly prefers to retain the halogen rather than the dithiocarbamate and the formed carbon radical clearly prefers to be deactivated by transfer of the dithiocarbamate. (Scheme 4)

Figure 1:
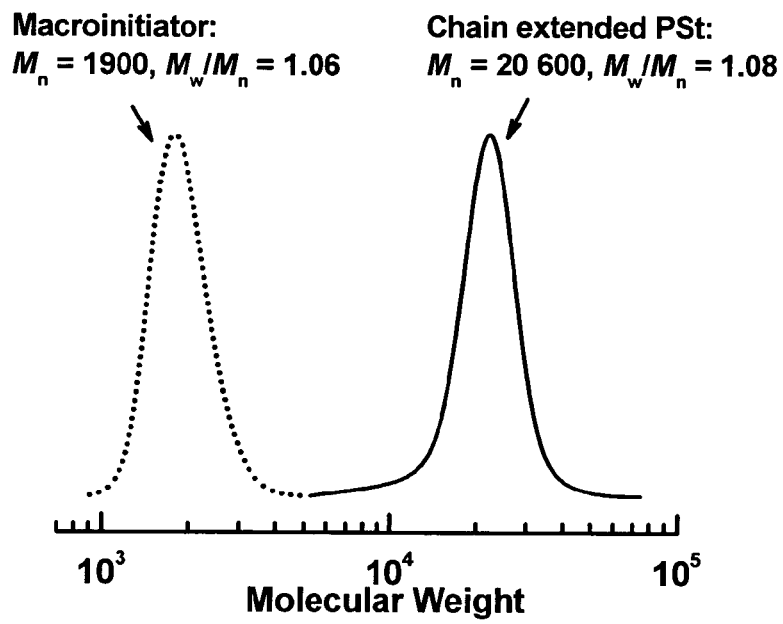
FIG. 1. GPC traces of PSt macroinitiator before (dotted line) and after (solid line) chain extension with St. Experimental conditions for chain extension with St: St/PSt macroinitiator/CuBr/PMDETA=200/1/1/2 in bulk at 120° C.

Furthermore the terminal dithiocarbamate group is preserved almost 100% on the first formed oligo/polymer chain end and therefore the first formed dithiocarbamate oligo/macroinitiators can be cleanly chain extended. Chain extension was carried out at 120° C. with the ratio of St/macroinitiator/CuBr/PMDETA=200/1/1/2. After 340 min reaction, completely chain extended PSt ($M_n=20\,600$, $M_w/M_n=1.08$) was observed without any unreacted macroinitiator remaining (FIG. 1).

Scheme 4: Activation and polymerization with a diethyldithiocarbamate initiator/dormant chain end.

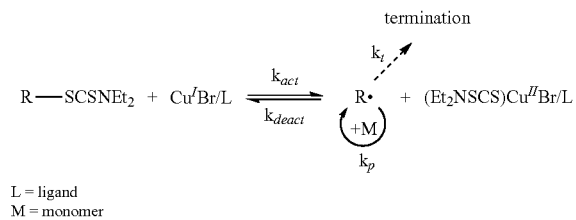

L = ligand
M = monomer

This result clearly demonstrates that the DC group at the PSt chain end can be extended with St, while retaining low PDI. This data clearly indicates that there is no exchange between the DC group and the halogen atom in the copper catalyst and DC group is always maintained at the chain end. The kinetic parameters of the reaction, namely, $k_{act}$ and $K_{ATRP}$, and the effect of residual initiator (R-) and ligand (L) structure on the degree of control of polymerization were determined and show clear differences between these novel DC transferable groups and the halogens employed in a "classic" ATRP procedure.

Scheme 5, illustrates one of the improvements of the disclosed process, which could be called a transition metal complex activated RAFT/CRP. In contrast to the standard RAFT polymerization process that requires a continuous supply of radicals from a radical initiator the new procedure is exemplified in scheme 5 by the continuous activation of the RAFT agent by copper bromide.

Scheme 5: Advantage of transition metal catalyzed RAFT when compared to prior art RAFT

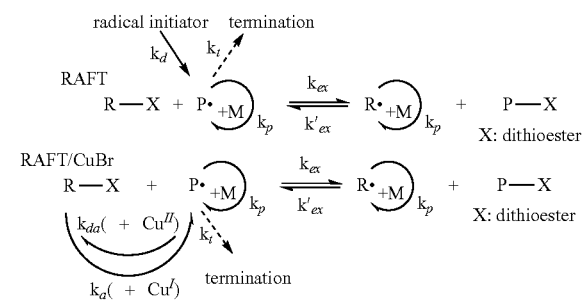

The disclosed process comprises an iniferter, or a reversible addition-fragmentation chain transfer (RAFT) agent, and an ATRP catalyst. No standard free radical initiators are added which, as disclosed below, allows conducting the reaction with lower concentrations of catalyst and preparation of higher molecular weight polymers with narrower polydispersity. In this procedure, since new polymer chains are not formed through a separate initiation procedure, purer polymers and purer block copolymers are formed.

Therefore one embodiment of this novel process is exemplified by conducting a "RAFT" block copolymerization with or without added copper catalyst. The reaction conditions are as follows:

1) RAFT polymerization:
[St]/[PMMA macroinitiator]/[AIBN]=400/1/1 at 60° C.,

2) Transition metal initiated "RAFT":
[St]/[PMMA macroinitiator]/[CuBr]/[PMDETA]=400/1/1/1 at 100° C.

Figure 2:
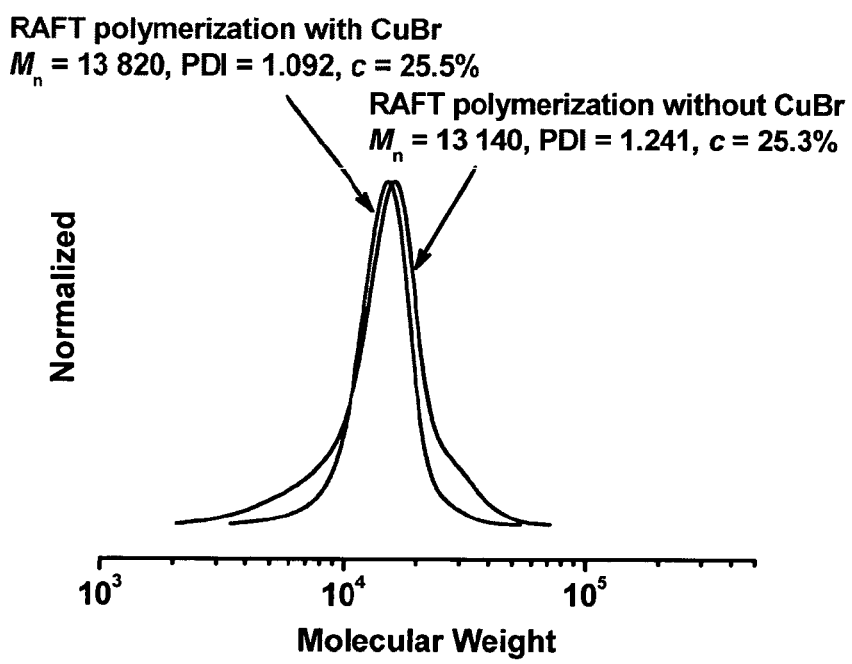
FIG. 2. GPC chromatogram of RAFT polymerization in the presence of CuBr/PMDETA and RAFT polymerization in the presence of AIBN without copper.

Coincidently in these comparator examples the conversion and molecular weight were almost identical although one polymerization was performed at 100° C. with copper catalyst and the other was carried out at 60° C. with a conventional radical initiator. The results of polymerization reactions are shown in FIG. 2.

The PDI in the RAFT polymerization activated by the copper catalyst was narrower compared to standard prior art RAFT polymerization. An examination of FIG. 2 clearly indicates the presence of dead polymer, in the RAFT polymerization conducted without the copper catalyst, at the left side of the GPC curve and chain coupled polymer at the right side of GPC chromatogram. Therefore addition of a transition metal catalyst complex to activate a "RAFT" polymerization or using different language to describe the reaction conduct a "transition metal mediated degenerative chain transfer polymerization" clearly provides a purer product.

As noted above, in the comments on Scheme 4, the copper (II)/ligand complex prefers to retain the halogen rather than the dithiocarbamate upon reduction by the active species and the formed carbon radical prefers to be deactivated by transfer of the dithiocarbamate rather than the halogen therefore the disclosed process additionally provides an efficient broadly applicable procedure for the preparation of RAFT/MADIX chain transfer mediators that can be optimally selected for each targeted monomer and further allows extension of transition metal mediated CRP to include controlled polymerization of electron donor monomers such as vinyl esters and ethers, vinyl pyrrolidones and vinyl carbazoles. The procedure for the preparation of chain transfer agents/mediators is shown in Scheme 6.

Scheme 6: Procedure for CTA agent synthesis; R—— can either be a low molecular weight molecule or a macromolecule.

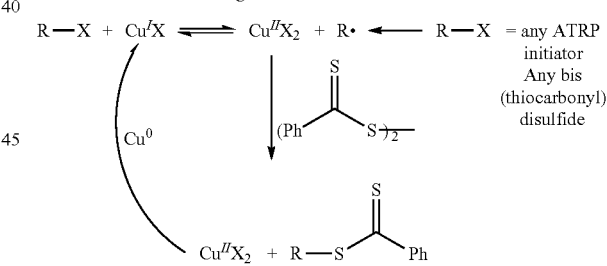

Scheme 6 is a schematic of a simple and versatile method to prepare, in one step, chain transfer agents (CTA) containing dithio-groups (dithiobenzoates, dithiocarbamates, and xanthates) with various alkyl substituents. If this procedure is compared to earlier disclosed atom transfer radical addition (ATRA) or atom transfer radical coupling (ATRC) processes this process can be called an Atom Transfer Radical Addition-Fragmentation (ATRAF) since the first formed radical either reforms the added initiator species or participates in an addition fragmentation reaction. ATRAF requires addition of any ATRP initiator and the selected bisthio-compound to a reaction medium further comprising an ATRP catalyst complex, or precursor of an ATRP catalyst, and a suitable reducing agent exemplified in scheme 6, and in examples below, as Cu(0) to form the targeted CTA. Other reducing agents disclosed in incorporated references, such as triethylamine, also work. The only additional requirement is that the reducing agent should not interact with the CTA.

The first alkyl halide ATRP initiator can comprise a small molecule, optionally comprising a second functional group, a macromolecule with terminal (pseude)halide groups or a linear molecule with distributed initiating sites along the polymer backbone or comprise an inorganic or organic surface. The surface comprising the first alkyl halide ATRP initiators can comprise a curved surface or a flat surface.

As exemplified below, this is a high yield reaction and the products of this reaction can be used directly in a transition metal mediated CTA polymerization providing a well controlled polymerization. In one embodiment of the invention the transition metal employed for the ATRAF reaction and the subsequent transition metal mediated CTA polymerization is the same transition metal and both reactions can be conducted in sequence in one pot.

Alkyl Dithiocarbamate and Xanthate Synthesis.

As detailed in the examples this novel ATRAF procedure is an efficient and selective reaction, leading to almost quantitative conversion of alkyl halides or ATRP initiators to form dithioester, dithiocarbamate, trithiocarbonate, or xanthate CTA's in high yield; or prepare dual functional ATRP initiators CTA polymerization mediators such as dibromotrithiocarbonates or bromoxanthates, without substantial impurities, under stoichiometric conditions, as well as under reduced copper(I) catalyst concentrations in the presence of reducing agents. This is in contrast to earlier qualitative work converting the chain end of macroinitiators prepared by ATRP to RAFT mediators which required a five fold excess of the disulfide and six fold excess of copper. (See Wager, C. M.; Haddleton, D. M.; Bon, S. A. F. *European Polymer Journal* 2004, 40, 641-645.) The CTAs synthesized by this process were directly used for reversible addition-fragmentation chain transfer (RAFT) polymerizations of styrene and methyl methacrylate, without any further purification steps, and produced well-controlled polymers with low polydispersity demonstrating the effectiveness of ATRAF for preparation of CTA and direct utilization of the catalyst and CTA in a transition mediated controlled CTA polymerization. If the CTA was purified by passage through a column then the RAFT polymerization required addition of a radical initiator or fresh transition metal catalyst.

Therefore in one embodiment of the invention a simple, versatile, one-step method to prepare various chain transfer agents (CTA) for RAFT polymerization is exemplified by an atom transfer radical addition-fragmentation (ATRAF) reaction conducted in the presence of a alkyl (pseudo)halide ATRP initiator, copper catalyst, and bis(thiocarbonyl) disulfide.

The former mentioned dithioesters are very efficient CTAs for RAFT polymerization of St, methyl methacrylate (MMA), and MA polymerization due to the stabilizing phenyl Z group. However, these RAFT agents are poor CTAs for less reactive monomers. RAFT polymerization of vinyl acetate (VAc), N-vinyl pyrrolidone (NVP), N-vinyl carbazole, etc. . . which are better controlled with ditiocarbamate or xanthate derivatives as CTAs. Therefore, in order to exemplify the broad utility of the present improvement in CRP technologies the ATRAF technique was subsequently employed to synthesize dithiocarbamates and xanthates for successful RAFT/MADIX polymerization or transition metal mediated chain transfer agent polymerization (TMMCTAP) of these monomers and transition metal activated RAFT/MADIX polymerizations.

The conditions employed for the preparation of an initial exemplary spectrum of CRP chain transfer agents are shown in Table 1.

Entry 6 shows the result of a dithiocarbamate synthesis under conditions similar to that with dithiobenzoate synthesis but with tetraethylthiuram disulfide, producing CTA f in 65% yield with a high purity (98%).

Xanthate synthesis using ATRAF was also successful under conditions similar to those of ditiobenzoates synthesis, giving xanthate h in 43% conversion with a high purity (99%).

Furthermore, ATRAF could be applied successfully at low temperature and with a reduced amount of copper(I) catalyst (5% relative to halide initiator). Entry 7 shows the result of dithiocarbamate synthesis via ATRAF with a ratio of [R—X]/[Disulfide]/[CuBr]/[PMDETA]/[Cu(0)]=1.1/0.55/0.027/0.055/1.21 M in acetone at room temperature for 18 h, resulting in 58% yield with high purity (99%).

This result shows that CTA synthesis via ATRAF, at room temperature with a catalytic amount of copper(I)/L, was efficient and successful and can be applied to a full spectrum of structures. Using abbreviations currently employed in the open literature this reaction could be called and ARGET ATRAF synthesis, i.e. an activator regenerated by electron transfer ATRAF.

TABLE 1

Chain Transfer Agents Syntheses via ATRAF$^a$

| entry | R-X | disulfide | CTA | CTA label | conv. (%) | yield (%) | purity (%) |
|---|---|---|---|---|---|---|---|
| 1 | | | | a | >99 | 92 | 99 |
| 2 | | | | b | >99 | 91 | 99 |
| 3 | | | | c | >99 | 89 | 98 |

TABLE 1-continued

Chain Transfer Agents Syntheses via ATRAF[a]

| entry | R-X | disulfide | CTA | CTA label | conv. (%) | yield (%) | purity (%) |
|---|---|---|---|---|---|---|---|
| 4 | | | | d | >99 | 92 | 99 |
| 5 | | | | e | 98 | 82 | 93 |
| 6[b] | | | | f | >99 | 65 | 98 |
| 7[c] | | | | g | >99 | 58 | 99 |
| 8 | | | | h | >99 | 43 | 99 |

[a]R-X/disulfide/CuBr/PMDETA/Cu(0) = 2/1/0.5/1/2.5 (205 mM) in toluene at 80° C. for 6 hours.
[b]performed at 60° C.
[c]R-X/disulfide/CuBr/PMDETA/Cu(0) = 2/1/0.05/0.1/2.2 (1.2 M) in acetone for 18 hours at room temperature.

The reaction is selective and efficient, producing high purity CTAs in high yields. Various exemplary alkyl halides ATRP initiators were used to prepare a range of dithiobenzoates, dithiocarbamates, and xanthates. The formed CTAs prepared via ATRAF were used for the RAFT polymerizations of St and MMA without further purification generating well-controlled polymers with low polydispersity. Moreover, high-purity CTA could be prepared at room temperature using a reduced amount of copper(I) catalyst and Cu(0) as a reducing agent. Other reducing agents disclosed in ARGET ATRP papers also work as exemplified by the use of triethylamine.

The initial series of five exemplary alkyl diethyldithiocarbamate initiators prepared as initiators for ATRP are shown in Scheme 7.

Scheme 7: Chemical Structures of exemplary alkyl diethyldithiocarbamate initiators namely, (1) cyanomethyl diethyldithiocarbamate (CMDC), (2) 1-cyanoethyl dithiocarbamate (ANDC), (3) 1-cyano-1-methylethyldiethyldithiocarbamte (MANDC), (4) 2-(N,N-diethyldithiocarbamyl)-isobutyric acid ethyl ester (MMADC), and (5) methyl([(diethylamino)carbonothioyl]thio)(phenyl)acetate (MPADC).

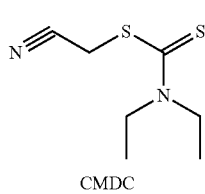

CMDC

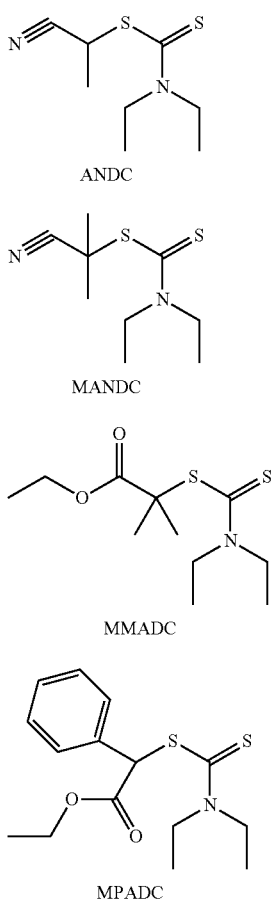

ANDC

MANDC

MMADC

MPADC

The improved process of transition metal complex mediated DC inifer CRP disclosed herein is exemplified by initially conducting a thermal iniferter polymerization of styrene as a comparator example. It can clearly be observed in FIG. 3 that the number-average molecular weight ($M_n$) of the polymer formed in this comparator reaction does not increase linearly with conversion when 2-(N,N-diethyldithiocarbamyl)-isobutyric acid ethyl ester (MMADC) is used as a thermal initiator, but actually decreases as a function of conversion. Furthermore, the polydispersity of the formed polymer increases with conversion. This behavior is in accordance with the known RAFT polymerization process (see, Moad, G.; Rizzardo, E.; Thang, S. H. *Australian Journal of Chemistry* 2005, 58, 379-410) in which the RAFT agent is inefficient (i.e., when the chain transfer constant ($C_{tr}$) is close to or smaller than unity). This is supported with low $C_{tr}$ of polystyrene radicals with iniferters, namely, tetramethylthiuram disulfide or 1-(N,N-diethyldithiocarbamyl)ethylbenzene ($C_{tr}$=0.29 and 4.4×10$^{-3}$ at 60° C., respectively).

However when an ATRP catalyst complex was added to the reaction medium and the various DC iniferters/ATRP initiators shown in Scheme 7, were employed for the polymerization of styrene significant improvements in the level of control were clearly observed, the rate of polymerization was increased and the GPC curves moved cleanly to higher molecular weight with no signs of tailing or coupling.

The first exemplary polymerization was conducted at 120° C. with a ratio of St/DC initiator/CuBr/PMDETA=100/1/1/1. FIG. 4a shows the kinetic plot of monomer conversion, which indicates linear increase in molecular weight with conversion, suggesting that a constant radical concentration is being maintained. FIG. 4b shows the regular evolution of $M_n$ and $M_w/M_n$. Polymerizations initiated using ANDC, MMADC, and MANDC in conjunction with an ATRP catalyst complex appeared to be well controlled. The molecular weight (MW) of polystyrene samples increased linearly with conversion, agreeing well with the theoretical values ($M_{n,th}$), and very low $M_w/M_n$s (<1.10) were observed.

Therefore in one embodiment of the process the addition of an ATRP transition metal catalyst, as defined in incorporated references, increases the degree of control attainable in a DC mediated polymerization. This is clear when one compares FIGS. 3 and 4, one can observe that polymerization with a DC initiator in the presence of a copper complex (in this example CuBr/PMDETA) brought significant improvement to the level of control exerted on the polymerization, in terms of both MW control and PDI.

However, the ATRP of styrene using CMDC produced a slow reaction and low conversion (ca. 7%) at 120° C. for 7 h reaction, forming low MW (oligomers to 2,000), with a bimodal shape in the GPC chromatogram. This result indicates that the selection of the secondary group adjacent to the sulfur atom in the iniferter/initiator has a role in determining the level of control in styrene polymerization confirming that initiator selection is a factor for optimum control over the polymerization and that steric effects should be considered.

Generally, in the ATRP processes disclosed by one of the present inventors in commonly assigned patents and patent applications, polar effects are a priority when selecting an efficient initiator for a specific polymerization and steric effects are a lesser concern. (See Tang, W.; Matyjaszewski, K. *Macromolecules* 2007, 40, 1858-1863.) For example when bromoacetonitrile, which is the halogen based ATRP initiator analogue of CMDC, was used as the initiator for a normal ATRP of styrene the polymerization was successful, while the result of ATRP with CMDC could be viewed as disappointing. Higher MW polystyrene was prepared at 120° C. with a ratio of St/MMADC (or MPADC)/CuBr/PMDETA=1000/1/2/2 the MWs increased linearly with conversion, and reached MW as high as 60,000 at ca. 80% conversion. The $M_w/M_n$ was slightly broader at lower conversion but it reached 1.2 at higher conversion. The ATRP of styrene with MPADC was slightly slower than that with MMADC and the $M_w/M_n$ of MMADC initiated polymerization was slightly narrower than that of MPADC. These results indicate that an initiator containing a tertiary group next to the sulfur atom (MMADC) provides a more controlled polymerization than the initiator containing a bulkier secondary group (MPADC) for ATRP of styrene based monomers in the presence of DC initiators. While this is an example of the importance of initiator selection, the results from both classes of initiators are acceptable.

Other examples are comparison of methyl α-bromophenylacetate (MBPA), ethyl α-bromoisobutyrate (EBiB), and their DC analogues. The activation rate constant of MBPA by CuBr/PMDETA is 2000 times larger than that of EBiB by the same catalyst (5.3×10$^3$ M$^{-1}$ s$^{-1}$ vs. 2.7 M$^{-1}$ s$^{-1}$). Therefore, it was anticipated that, at least, MBPA is a better initiator for ATRP and it was successfully used in an initiator in a modified Initiator Continuous Activator Regeneration (ICAR) ATRP (See Braunecker, W. A.; Matyjaszewski, K. *Progress in Polymer Science* 2007, 32, 93-146; and Tang, W.; Kwak, Y.; Braunecker, W.; Tsarevsky, N. V.; Coote, M. L.; Matyjaszewski, K. *J. Am. Chem. Soc.* 2008, 130, 10702-10713) giving a very good control over the MW and PDI.

Therefore in one embodiment of the invention DC initiators for the transition metal mediated polymerization of styrene based monomers comprise secondary or tertiary substituents next to the sulfur atom.

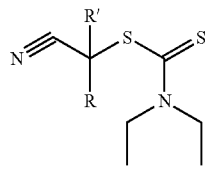

Therefore in the preferred initiator, either one of R or R' can be H and either or both R and R' can be halogen, $C_1$-$C_{20}$ alkyl, $C_3$-$C_8$ cycloalkyl, OH, CN, $C_2$-$C_{20}$ alkenyl, $C_2$-$C_{20}$ alkynyl, oxiranyl, glycidyl, aryl, heterocyclyl, aralkyl, aralkenyl, $C_1$-$C_6$ alkyl in which from 1 to all of the hydrogen atoms are replaced with halogen and $C_1$-$C_6$ alkyl substituted with from 1 to 3 substituents selected from the group consisting of $C_1$-$C_4$ alkoxy, aryl, heterocyclyl, C(=Y)$R^5$, C(=Y)N$R^6R^7$, oxiranyl and glycidyl, where $R^5$ is alkyl of from 1 to 20 carbon atoms, alkoxy of from 1 to 20 carbon atoms, aryloxy or heterocyclyloxy; and $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring.

Effect of Ligand Structure.

As noted review articles on ATRP ligand structure can affect the activity of the formed catalyst complex and hence the level of control one can attain over the polymerization. (See Tang, W.; Kwak, Y.; Braunecker, W.; Tsarevsky, N. V.; Coote, M. L.; Matyjaszewski, K. *J. Am. Chem. Soc.* 2008, 130, 10702-10713). The ATRP of styrene with MMADC and CuBr was carried out in the presence of different nitrogen-based ligands. Table 2 summarizes the results. Polymerization with bidentate ligand, TMEDA, indicated fairly controlled polymerization, producing $M_n$ of 8790 and $M_w/M_n$ of 1.33 at full conversion. The best controlled polymerization was obtained with tridentate ligand, PMDETA, producing the lowest $M_w/M_n$. A tridentate ligand with 2 pyridine rings along with one alkyl chain, BPMODA, showed also fairly well-controlled polymerization. On the other hand, polymerization using tridentate ligand with 3 pyridine rings, tNtpy, showed poorly-controlled polymerization, producing higher MW polymer than theoretical value with high $M_w/M_n$ (2.20) even at 52% conversion. Surprisingly, both of the bridged tetradentate ligands, $Me_6$TREN and TPMA, resulted in uncontrolled polymerization, giving polymers with high $M_w/M_n$>2.14. In contrast, linear tetradentate ligand, HMTETA, yielded fairly well-controlled polymerization. This observation is completely opposite from that of Br or Cl-based ATRP. The reason for this can be explained by consideration of the $k_a$ and $k_{da}$ (see above).

TABLE 2

Polymerization of Styrene Using a Series of Ligands with Initial Mole Ratio of Reagents: St/MMADC/CuBr/ligand = 100/1/1/1 in Bulk at 120° C.

| ligand | time (min) | conv (%) | $M_{n,GPC}$ | $M_{n,th}$ | $M_w/M_n$ |
| --- | --- | --- | --- | --- | --- |
| TMEDA | 240 | 41 | 3400 | 4100 | 1.47 |
| | 570 | 99 | 8800 | 9900 | 1.33 |
| PMDETA | 30 | 13 | 1200 | 1300 | 1.07 |
| | 360 | 94 | 8700 | 9400 | 1.07 |
| BPMODA | 60 | 15 | 1000 | 1500 | 1.40 |
| | 250 | 86 | 7900 | 8600 | 1.17 |

TABLE 2-continued

Polymerization of Styrene Using a Series of Ligands with Initial Mole Ratio of Reagents: St/MMADC/CuBr/ligand = 100/1/1/1 in Bulk at 120° C.

| ligand | time (min) | conv (%) | $M_{n,GPC}$ | $M_{n,th}$ | $M_w/M_n$ |
| --- | --- | --- | --- | --- | --- |
| tNtpy | 30 | 21 | 1500 | 2100 | 1.99 |
| | 260 | 52 | 3100 | 5200 | 2.20 |
| HMTETA | 60 | 12 | 1100 | 1200 | 1.28 |
| | 690 | 87 | 7400 | 8700 | 1.32 |
| $Me_6$TREN | 105 | — | 6100 | — | 2.14 |
| TPMA | 20 | 14 | 1200 | 1400 | 2.27 |
| | 150 | 61 | 5900 | 6100 | 2.42 |

A series of ATRP of MMA with MANDC and CuBr were carried out in the presence of different nitrogen-based ligands and the results are shown in Table 3.

TABLE 3

MMA Polymerization Using a Series of Ligands with Initial Mole Ratio of Reagents: MMA/MANDC/CuBr/ligand = 100/1/1/1 in Bulk at 100° C.

| ligand | time (min) | conv (%) | $M_{n,GPC}$ | $M_{n,th}$ | $M_w/M_n$ |
| --- | --- | --- | --- | --- | --- |
| TMEDA | 5 | 21 | 5500 | 4200 | 1.21 |
| | 30 | 66 | 20400 | 13200 | 1.10 |
| bpy | 10 | 21 | 6700 | 4200 | 1.33 |
| | 42 | 75 | 18200 | 15000 | 1.16 |
| PMDETA | 10 | 20 | 11400 | 4000 | 1.65 |
| | 38 | 53 | 20600 | 10600 | 1.43 |
| BPMODA | 5 | 26 | 7000 | 5200 | 1.39 |
| | 40 | 71 | 20400 | 14200 | 1.18 |
| HMTETA | 9 | 34 | 10900 | 6800 | 1.34 |
| | 28 | 66 | 18300 | 13200 | 1.26 |

Catalyst complexes formed with TMEDA and bpy, provided the best controlled polymerizations, producing PMMA with low $M_w/M_n$ although $M_n$s were slightly higher than theoretical values. A less well controlled polymerization of MMA was obtained with catalyst formed with a tridentate ligand, PMDETA, producing polymer with the highest PDI, which is totally opposite from the results with styrene. Both tridentate and tetradentate ligand, BPMODA and HMTETA, complexed catalysts showed fairly well-controlled polymerization.

These results clearly show that ligand selection is both important and monomer dependant in order to obtain well-defined polymers. For example, PMDETA is the best ligand for polymerization of styrene, followed by BPMODA, HMTETA, and TMEDA while $Me_6$TREN and TPMA are poorer ligands for well controlled styrene polymerization. PMDETA is an unfavorable ligand for MMA polymerization. The best ligands for MMA polymerization are bpy or TMEDA, followed by HMTETA and BPMODA.

Effect of Ligand/Copper Ratio.

The ligand/copper ratio is also a parameter to be considered when preparing a catalyst complex for ATRP because it has a strong effect on the polymerization rate and the level of control achieved in the polymerization. A series of styrene polymerizations were carried out varying amount of ligand to transition metal without changing any other ratio. Table 4 summarizes the results after 4 hours polymerization.

TABLE 4

Results Styrene Polymerizations after 4 h Reaction Using Different Mole Ratio of Ligand: St/MMADC/CuBr/PMDETA = 100/1/1/0-3 at 120° C.

| entry | [PMDETA]$_0$/[CuBr]$_0$ | $M_{n,GPC}$ | $M_{n,th}$ | $M_w/M_n$ | conv (%) |
|---|---|---|---|---|---|
| 1 | 0 | 3000 | 2400 | 2.00 | 24 |
| 2 | 0.25 | 7500 | 8200 | 1.14 | 82 |
| 3 | 0.50 | 8600 | 9200 | 1.10 | 92 |
| 4 | 0.75 | 6600 | 7500 | 1.08 | 75 |
| 5 | 1.00 | 6000 | 6800 | 1.07 | 68 |
| 6 | 2.00 | 4600 | 5500 | 1.09 | 55 |
| 7 | 3.00 | 4200 | 5000 | 1.09 | 50 |

In the absence of added ligand (entry 1), the conversion was only 24% and $M_w/M_n$ was 2.00. Molecular weight distributions, ($M_w/M_n$), were quite low for the other polymerizations conducted with added ligand and was lowest when a 1/1 ratio of ligand/copper was used (entry 5). However, conversion reached maximum when a ratio of ligand/copper equal to 1:2 was used (entry 3). First-order kinetic plots with respect to monomer were observed in the bulk ATRP's of styrene reported in Table 4. Based on the slope, the values of rate of polymerization ($R_p$) as a function of the [PMDETA]$_0$ [CuBr]$_0$ there is a strong dependence between the $R_p$ and the ratio of ligand/copper catalyst. With an increase of ligand amount, $R_p$ increased and reached a maximum at [PMDETA]$_0$/[CuBr]$_0$ ratio=0.5/1.0. But $R_p$ decreased with any further increase in the amount of ligand. The observed maximum $R_p$ at [PMDETA]$_0$/[CuBr]$_0$ ratio=0.5 could be due to the formation of an optimum ratio of activator to deactivator concentration under this condition. In the presence of excess ligand ([PMDETA]$_0$/[CuBr]$_0$ ratio>1), there is a possibility of degenerative chain transfer to the ligand which would decrease the $R_p$ due to the loss of active chains from the reaction.

$K_{ATRP}$ and $k_a$.

The evaluation of the reaction parameters, $k_a$ and $k_{da}$ (activation and deactivation rate constants) is a factor to be evaluated for further understanding of ATRP with DC based initiators/catalyst complexes. $K_{ATRP}$ and $k_a$ were measured for some selected initiator/ligand system by the modified Fischer's equation (see, Tang, W.; Tsarevsky, N. V.; Matyjaszewski, K. *J. Am. Chem. Soc.* 2006, 128, 1598-1604), and TEMPO capturing method, (See Matyjaszewski, K.; Paik, H.-j.; Zhou, P.; Diamanti, S. J. *Macromolecules* 2001, 34, 5125-5131) respectively. Table 5 summarizes the results. The value of $k_a$ of MMADC/CuBr system (0.12 M$^{-1}$ s$^{-1}$) was ca. 20 times smaller than that of the EBiB/CuBr (2.7 M$^{-1}$ s$^{-1}$) when the same ligand, PMDETA, was employed to form the catalyst complex. However, the value for $k_{da}$ (=$k_a/K_{ATRP}$) was ca. 2 times larger for MMADC/CuBr system, which provides an understanding of why this presently disclosed system with DC based initiators produces such well-controlled polymers. Changing the initiator from MMADC to MANDC resulted in a significant change in the value of $k_a$, the activation rate constant increased 10 fold, which explains why MMA polymerization was more successful with MANDC as the initiator. The values of $k_a$ of entry 4 and 6 indicated that HMTETA complexed catalyst/initiator have much lower $k_a$ values than the PMDETA complexed catalyst/initiator system. The $k_a$ values of MMADC/CuBr with PMDETA, HMTETA, and Me$_6$TREN indicate 0.12, 0.0075, and 0.0077 M$^{-1}$ s$^{-1}$, respectively. The value of $k_a$ of MMADC/Me$_6$TREN system (entry 7) is rather low, which explains why the Me$_6$TREN based catalyst complex could not control the polymerization. Entry 8 shows that halogen initiator (EBiB) can be activated by CuDC/PMDETA and the $k_a$ of this system is 4 times larger than that of MMADC by CuBr/PMDETA complex, but 3 times lower than the $k_a$ of EBiB by same complex. Generally speaking, $k_{da}$ of studied systems in this disclosure are very comparable to that of normal ATRP. The general activity of the substitution group for the initiators increased in the order of ester<cyano and the ligands increased Me$_6$TREN≈HMTETA<<PMDETA.

TABLE 5

Activation Rate Constant ($k_a$), Equilibrium Constant ($K_{ATRP} = k_a/k_{da}$), and Deactivation Rate Constant ($k_{da}$)$^a$

| entry | initiator | ligand | $k_a{}^a$ (M$^{-1}$ s$^{-1}$) | $K_{ATRP}{}^b$ | $k_{da}$ (M$^{-1}$ s$^{-1}$) |
|---|---|---|---|---|---|
| 1 | MMADC | PMDETA | 0.12 | 2.0 × 10$^{-9}$ | 6.1 × 10$^7$ |
| 2 | EBiB | PMDETA | 2.7 | 7.5 × 10$^{-8}$ | 3.6 × 10$^7$ |
| 3 | MANDC | PMDETA | 1.1 | 8.8 × 10$^{-8}$ | 1.3 × 10$^7$ |
| 4 | MMADC | HMTETA | 0.0075 | — | — |
| 5 | EBiB | HMTETA | 0.14 | 1.1 × 10$^{-8}$ | 1.3 × 10$^7$ |
| 6 | MANDC | HMTETA | 0.016 | 2.7 × 10$^{-9}$ | 5.9 × 10$^6$ |
| 7 | MMADC | Me$_6$TREN | 0.0077 | — | — |
| 8$^c$ | EBiB | PMDETA | 0.87 | — | — |

$^a$Values of $k_a$ were measured using [TEMPO]$_0$/[ligand]$_0$/[CuBr]$_0$/[initiator]$_0$ = 10/10/10/1 mM and only entry 4 was measured using [TEMPO]$_0$/[ligand]$_0$/[CuBr]$_0$/[initiator]$_0$ = 50/50/50/5 mM at room temperature in MeCN.
$^b$Values of $K_{ATRP}$ was measured using [ligand]$_0$/[CuBr]$_0$/[initiator]$_0$ = 10/10/10 mM (entry 1 and 3) and [ligand]$_0$/[CuBr]$_0$/[initiator]$_0$ = 100/100/100 mM (entry 6) at room temperature in MeCN.
$^c$Value of $k_a$ was measured using [TEMPO]$_0$/[ligand]$_0$/[CuDC]$_0$/[EBiB]$_0$ = 10/10/10/1 mM at room temperature in MeCN.

Since dithioesters, in the presence of copper catalysts, act as initiators/dormant species for ATRP and also as chain transfer agents for RAFT the possibility of conducting a concurrent ATRP/RAFT (i.e. Cu-catalyzed RAFT polymerization or dithioester initiated ATRP) polymerization was examined.)

As disclosed herein this procedure allowed for the preparation of pure PMMA-b-PSt block copolymer and high molecular weight PMMA, over one million with low polydispersity. As detailed in the examples poly(vinyl acetate)-b-PSt, PVAc-b-PMMA and PVAc-b-PMA block copolymers have been prepared with appropriate transfer.

Some termination occurs in both conventional RAFT and ATRP (as well as in concurrent ATRP/RAFT) systems but there is no generation of new radicals in concurrent ATRP/RAFT, (Scheme 5). Therefore, concurrent ATRP/RAFT CRP can be employed to prepare high molecular weight polymers and purer block copolymers, while properly maintaining chain end functionality.

Concurrent ATRP/RAFT provides advantages over conventional RAFT and ATRP.

1) The formation of new chains is suppressed by generating the initiating radical directly from the CTA in the presence of copper catalyst, without adding an initiator to form radicals, that produce new chains.

2) While high molecular weight polymers can be accomplished by activators re-generated by electron transfer (ARGET) ATRP attaining low polydispersity require the presence of a minimum amount of rapidly deactivating $Cu^{II}$ complex. The presence of CTA should facilitate formation a polymer with a lower PDI because of the very high chain transfer constant ($C_{ex}$=6000±2000 at 40° C.). (See, Goto, A.; Sato, K.; Tsujii, Y.; Fukuda, T.; Moad, G.; Rizzardo, E.; Thang, S. H. *Macromolecules* 2001, 34, 402-408.)

When concurrent ATRP/RAFT is conducted with dithioesters control agents, that act as initiators/dormant species for ATRP and as chain transfer agents for RAFT, was applied to polymerization of both St and MMA the reactions were well-controlled. The polymerization rate followed first-order kinetics with respect to monomer conversion and molecular weights increased linearly up to high conversion. In contrast to ARGET ATRP ARGET RAFT does not have to maintain a desired ratio of Cu(I) to Cu(II) but only maintain a low concentration of propagating radicals through continuous activation by Cu(I). Because of the rapid exchange reaction with the CTA a controlled polymerization is accomplished. This means that the very low catalyst concentration leads to less side reactions and the lower radical concentration leads to less termination. Therefore there is no lower limit for catalyst/deactivator concentration since Cu(0) regenerates Cu(I) from Cu(II) formed due to termination reactions and no limit to attaining high molecular weight polymers. In contrast to standard RAFT there are no new chains formed in this procedure.

In one embodiment of the process a novel ARGET RAFT procedure was developed for preparation of ultra high molecular weight polymers with narrow polydispersity. Increasing amounts of CuBr/L in the system resulted in faster polymerization. The rate of polymerization ($R_p$) with CuBr/Me$_6$TREN was faster than with CuBr/PMDETA.

Photo-ATRP of MMA.

In order to demonstrate the utility of photo-induced ATRP of MMA a polymerization was carried out at room temperature in the presence of MMADC, CuBr, and bpy as ligand. MMADC was chosen as the initiator because it showed poor-control of MMA polymerization when PMDETA was employed as the ligand, see Table 3. In order to provide a direct comparison a similar polymerization was conducted at 100° C. under the same polymerization conditions, ([MMA]/[MMADC]/[CuBr]/[bpy]=200/1/1/2. The result of this comparator experiment showed that the initiation efficiency of MMADC was less than 50% and the molecular weight of the polymer reached ca. 20,000 at 10% conversion. The PDI remained >1.5 throughout the polymerization (~80% conversion).

The photo-induced ATRP was performed by irradiating the whole region with UV light (mercury lamp HBO 200 W) at 15 cm-distance. Molecular weight increased linearly with increase of conversion and it was almost identical to the theoretical molecular weight. The PDI value was below 1.5 from an early stage of polymerization and was <1.2 at later stages of the polymerization (ca. 70%). This demonstration clearly indicates that the ATRP of MMA in the presence of a DC initiator was greatly improved by the application UV light.

This demonstration of the photo-responsiveness of the DC initiator provides a new method for preparing pure copolymers by a combination of RAFT and ATRP. This observation provided the knowledge that allows one to conduct an ATRP/RAFT, or transition metal mediated chain transfer agent (CTA) polymerization combining the advantages of both procedures and providing a simple procedure for controlled radical polymerization not by adding a radical initiator to control the rate of reaction but by generating the radical from the RAFT agent itself by the reaction with a copper catalyst.

Herein, we demonstrated such a methodology to prepare a polymer and for preparation of the control agents.

Initially the activation of a standard RAFT agent by copper catalyst was demonstrated by examination of the kinetics of activation of the transfer agent by a copper complex. The procedure employed was based on the techniques developed for determining the kinetics in a standard ATRP reaction. (See Matyjaszewski, K.; Paik, H.-j.; Zhou, P.; Diamanti, S. J. *Macromolecules* 2001, 34, 5125-5131) 50 mM of CDB, PMDETA, TEMPO, and anisole (internal standard, blue arrow) were mixed in MeCN-d$_3$ and degassed thoroughly. The kinetics were followed by $^1$H NMR. The spectrum at time zero was measured without CuBr and as time went by, peaks (0.7-1.7 ppm) due to formation of cumyl-TEMPO gradually increased and the peak at 2.05 ppm from free CDB gradually decreased. This change clearly demonstrates that the RAFT agent was activated by the copper catalyst. Activation rate constant, $k_a$, was calculated to $1.35 \times 10^{-3}$ M$^{-1}$ s$^{-1}$ by following decrease of the $^1$H NMR peak at 2.05 ppm. This value is very small compared to $k_a$ of phenylethyl bromide with CuBr/PMDETA (0.17 M$^{-1}$ s$^{-1}$) nevertheless activation of the RAFT agent by copper catalyst was confirmed. The $R_p$ was increased by adding a reducing agent, initially exemplified by copper powder.

PMMA with high targeted molecular weight, up to over one million with narrow molecular weight distribution, was successfully prepared by ARGET ATRP/RAFT. Indeed PMMA up to $M_n$=1,250,000 g/mol; PDI=1.21 and block copolymer PMMA-b-PBMA $M_n$=1,420,000 g/mol; PDI=1.21 were prepared. Purer block copolymers PMMA-b-PSt, were synthesized by concurrent ATRP/RAFT than by conventional RAFT. This demonstrates that the control in ATRP/RAFT can be improved in comparison with conventional RAFT polymerization.

Continuing to exemplify and extend the concept of conducting concurrent ATRP/RAFT polymerization to prepare novel materials an initiator/iniferter comprising a trithiocarbonate (TTC) moiety and two bromine chain ends was prepared and used to successfully conduct, independently, sequentially or concurrently, an atom transfer radical polymerization (ATRP) and a reversible addition-fragmentation chain transfer (RAFT) polymerization.

Synthesis of a dibromo-trithiocarbonate (DiBrTTC) iniferter and its use in a series of CRP's provided information that appropriate selection of the monomer/catalyst couple allows polymerization exclusively through the trithiocarbonate moiety, exclusively through the bromine chain ends to form well defined block copolymers or through both the trithiocarbonate and the bromine chain ends simultaneously (Scheme 8). In the latter case, depending on the monomer and catalyst, either ATRP or both RAFT and ATRP mechanisms are participating in polymer chain growth, yielding polymers with different molecular weight distributions ($M_w/M_n$).

Scheme 8. Effect of Monomer and Catalyst on Polymerization Mechanism with DiBrTTC

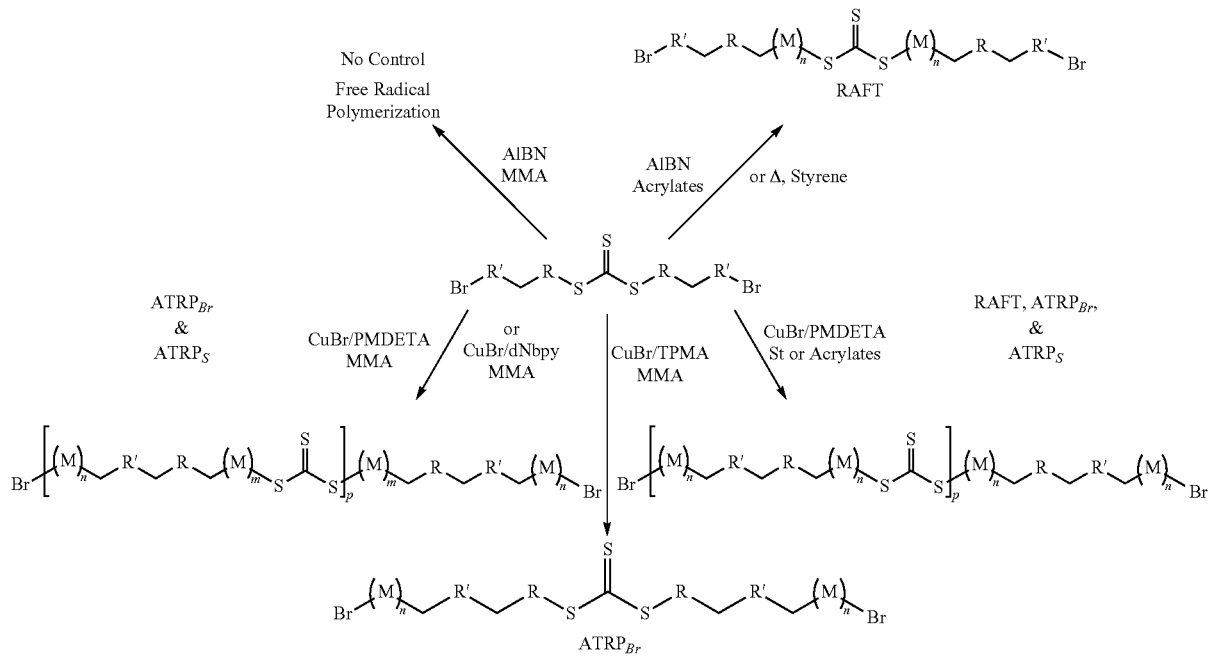

The effectiveness of the bi-functional DiBrTTC for the RAFT polymerization of acrylates was evaluated by polymerizing nBA in 33% anisole solution at 70° C. After 100 minutes, poly(n-butyl acrylate) with $M_n$=7,450 g/mol ($M_{nth}$=8,150 g/mol) and $M_w/M_n$=1.15 was obtained. Good control was achieved up to high conversion. A linear increase of the molecular weight with conversion as well as low PDIs was observed and a linear relationship between $\ln([M]_0/[M]_t)$ versus time was observed, indicating that no detectable termination occurred in this system although a small induction period of ca. 10 min was observed. This initiator was also effective for a self-initiated, or thermal (Δ), RAFT polymerization of and yielded polymers with narrow molecular weight distribution, $M_w/M_n \leq 1.16$.

Under the same conditions polymerization of methyl methacrylate (MMA) was poorly controlled. However, ATRP of MMA with the dibromo-trithiocarbonate (DiBrTTC) iniferter was successful in the presence of copper catalysts formed with various nitrogen-based ligands. Polymers with narrow molecular weight distribution ($M_w/M_n$<1.27) were obtained in every case.

Depending on the ligand, ATRP polymerization proceeded only through the bromine chain ends or through both the bromine chain ends and the TTC moiety.

Polymerization of MMA in the presence of CuBr/TPMA complex proceeded by ATRP, i.e exclusively through the bromine chain ends, yielding polymer with low molecular weight distribution, 1.23.

Polymerization of MMA in the presence of CuBr/PMDETA or CuBr/dNbpy complex proceeded by ATRP through the bromine chain ends and the trithiocarbonate function, yielding polymer with low polydispersity, 1.27 and 1.21, respectively.

In order to study the influence of the trithiocarbonate structure during the polymerization of MMA with CuBr/TPMA, a dibromo-trithiocarbonate polystyrene macroiniferter was used to polymerize MMA. The dibromo-trithiocarbonate polystyrene macroiniferter ($M_n$=12,300 g/mol and $M_w/M_n$=1.16) was prepared by polymerizing styrene in bulk at 130° C. with the difunctional dibromo-trithiocarbonate initiator/transfer agent. This macroiniferter was subsequently used to polymerize MMA in 50% anisole solution at 25° C. After 6 hours monomer conversion was 34.5% and a PMMA-b-PS-b-PMMA with $M_n$=58,550 g/mol ($M_{nth}$=48,800 g/mol) and $M_w/M_n$=1.40 was obtained.

In order to determine if the polymerization took place only through the bromine chain ends, the block copolymer was subsequently cleaved by methanolysis. Methanolysis was achieved by refluxing for 16 hours $1\times10^{-3}$ mmol of PMMA-b-PS-b-PMMA and 8.75 mmol of sodium methoxide in 6 mL of a 2/1 THF/MeOH solution. The molecular weight of the final polymer was 13,700 g/mol, approximately 4 times lower than the initial block copolymer, and $M_w/M_n$ was 2.03. A decrease of the molecular weight by a factor of 4 after methanolysis is consistent with a first block obtained by pure RAFT (growth via the central trithiocarbonate moiety) and a second step with growth of PMMA via the bromine chain ends.

ATRP and RAFT polymerization of St and n-butyl acrylate (nBA) were conducted concurrently using CuBr/PMDETA as catalytic system. Polymers with broad molecular weight distribution ($M_w/M_n \approx 1.6$) and polymodal size exclusion chromatography traces were obtained due to chain reshuffling through the TTC moiety. SEC analysis of the polymers after aminolysis or methanolysis showed that ATRP and RAFT occurred simultaneously, with good control, for each nBA and St ($M_w/M_n$<1.3).

A difunctional inifer (or mono-functional bromoxanthate inifer according to scheme 9, i.e. a bromine (or chlorine) function in one end and xanthate function in the other end) was then applied to the synthesis of novel block copolymers. Poly(vinyl acetate)-b-polystyrene, poly(vinyl acetate)-b-poly(methyl acrylate) and poly(vinyl acetate)-b-poly(methyl methacrylate) block copolymers with low polydispersity ($M_w/M_n$<1.25) were prepared by successive transition metal mediated reversible addition—fragmentation chain transfer (RAFT) polymerization and atom transfer radical polymerization (ATRP). ATRP of (meth)acrylates or styrenics monomers could be conducted either before or after the RAFT polymerization of VAc (Scheme 9). The same transition metal complex can be employed for both steps in a sequential dual mechanism block copolymerization.

Triblock, pentablock or multiblock copolymers were prepared in two steps by appropriate selection of monomers and catalytic systems.

Therefore one embodiment of the invention discloses how to conduct sequential ATRP and RAFT reactions with one initiator or simultaneous ATRP and RAFT reactions.

Scheme 9: Synthesis of poly(vinyl acetate) block copolymers by sequential ATRP and RAFT polymerization using a mono-functional bromoxanthate iniferter.

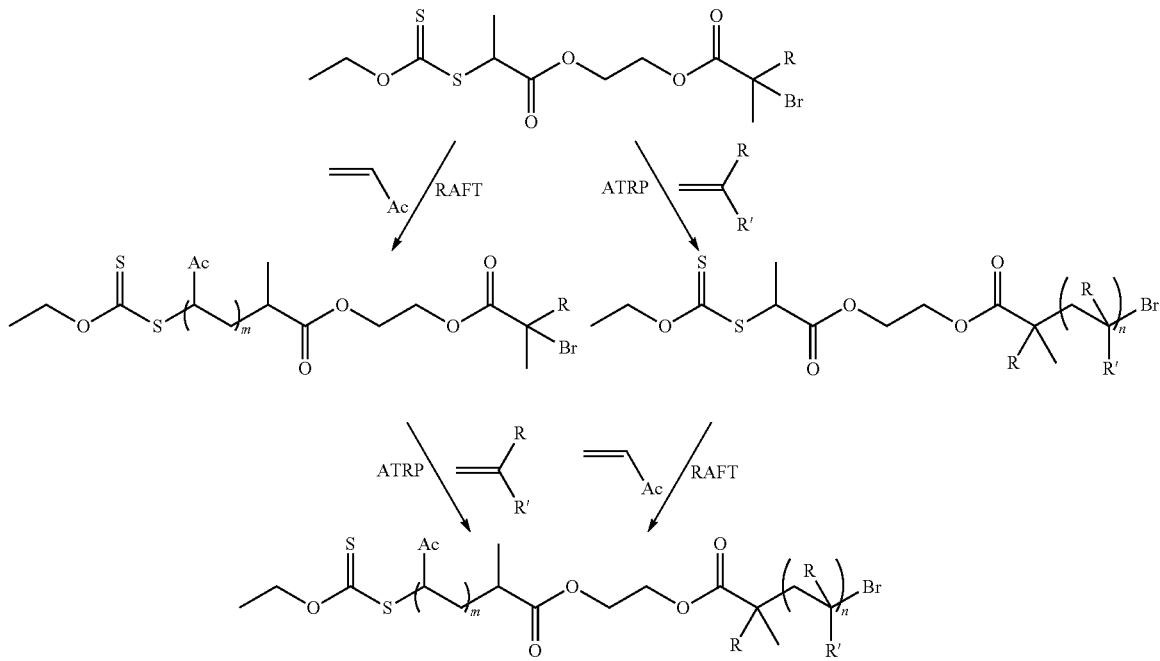

R = H or CH$_3$
R' = COOCH$_3$ or Ph

ATRP of methyl methacrylate (MMA), methyl acrylate (MA) and styrene (St) was conducted. Polymers with low $M_w/M_n$ with good agreement between theoretical and experimental molecular weights were obtained for all three systems. Macroiniferters prepared by ATRP were subsequently used to mediate the RAFT polymerization of VAc. A well defined PMA-b-PVAc block copolymer with $M_n$=12,900 ($M_{n,th}$=12,200) and $M_w/M_n$=1.31 was obtained.

Similarly a poly(vinyl acetate) macroiniferter was prepared by RAFT polymerization of VAc yielding a poly(vinyl acetate) (PVAc) with $M_n$=8,350 ($M_{n,th}$=8,550) and $M_w/M_n$=1.29. "Halogen exchange" was applied to the chain extension reaction to prepare PVAc-b-PMMA block copolymers from the macroiniferter.

The PVAc macroiniferter was subsequently used to prepare well defined PVAc-b-PS, PVAc-b-PMA and PVAc-b-PMMA block copolymers, 1.15≦$M_w/M_n$23 1.24, by ATRP of styrene and methyl (meth)acrylate, providing the first example of a dual initiator for the ATRP and RAFT polymerization of conjugated and non conjugated monomers.

This approach offers a very efficient, straightforward and universal method to prepare block copolymers incorporating a full range of radically copolymerizable monomers by providing a means to select the CRP process best suited to the monomer for any specific segment. Monomers of particular interest include unconjugated monomers such as 1-vinyl 2-pyrrolidone, vinyl acetate, vinyl carbazole etc.

In another embodiment the same catalyst complex can be employed for the ATRAF synthesis of the CTA and then the transition metal mediated chain transfer controlled polymerization process (ATRP/RAFT). This allows a simple one pot synthesis of the desired (co)polymer.

Indeed one can conduct concurrent ATRP and RAFT polymerization employing a simple one pot tow step ATRAF reaction to form an initiator/inifer such as that shown in scheme 9 bt adding an excess of the alkyl halide compared to the disulfide in the CTA synthesis in an ATRAF step the add monomers in desired sequence to for the targeted block copolymer. This procedure also indicates that one can prepare conjugated and non-conjugated block copolymers by conducting a sequential ATRP/ATRAF/CTA polymerization. First ATRP is conducted then introduction of a xanthate or dithiocarbamate chain end to the active halide chain end(s) by ATRAF, finally RAFT (or MADIX) polymerization of non-conjugated monomers.

EXAMPLES AND DISCUSSION OF EXAMPLES

Chemicals. Styrene and methyl methacrylate (Aldrich, 99%) were passed through a column filled with basic alumina, dried over calcium hydride, and distilled under reduced pressure prior to use. Bis(thiobenzoyl) disulfide (BTBD, 99%) N,N-bis(2-pyridylmethyl)octadecylamine (BP-MODA), 4,4',4''-tris(5-nonyl)-2,2':6',2''-terpyridine (tNtpy), Tris(2-(dimethylamino)ethyl)amine (Me$_6$TREN), and tris-[(2-pyridyl)methyl]amine (TPMA) were synthesized according to procedures previously reported in incorporated references. CuDC was prepared according to previously reported literature procedures. (See Akerstrom, S. *Arkiv. Kemi* 1959, 14, 387-401) Copper(I) bromide (Aldrich, 99.999%), copper powder (Aldrich, <425 μm, 99.5%), carbon disulfide (Aldrich, anhydrous, >99%), ethyl α-bromoisobutyrate (EBiB, 98%, Aldrich), ethyl 2-bromopropionate (EBP, 99%, Aldrich), ethyl a-bromophenylacetate (EBPA, 97%, Aldrich), dimethyl 2,6-dibromoheptanedioate (Aldrich, 97%), tetraethylthiuram disulfide (TETD, Aldrich, 97%), NaDC (Aldrich, 99%), 2,2,6,6-tetramethylpiperidinyl-1-oxy (TEMPO, Aldrich, 99%), 2,2'-bipyridine (bpy, Aldrich, 99%), N,N,N',N'-tetramethylethylenediamine (TMEDA, Aldrich, 99%), PMDETA (Aldrich, 99%), and N,N,N',N'',N''',N'''-hexamethyltriethylenetetramine (HMTETA, Aldrich, 97%) were used as received. All the other reagents and solvents were used as received. BTBD was purified by triple recrystallization from ethanol to increase purity, obtained as red flakes (34% yield and >99% purity). α,α'-azobis(isobutyronitrile) (AIBN, 98%, Aldrich) was purified by recrystallization from methanol. Bis(ethylxanthogen) (Pfaltz & Bauer, 97%) was purified by distillation under reduced vacuum.

Analyses. Molecular weight and polydispersity were determined by gel permeation chromatography (GPC). The GPC was conducted with a Waters 515 pump and Waters 410 differential refractometer using PSS columns (Styrogel 10$^5$, 10$^3$, 10$^2$ Å) in tetrahydrofuran (THF) as an eluent at a flow rate of 1.0 mL/min (35° C.). The column system was calibrated with linear polystyrene (PSt) and poly(methyl methacrylate) (PMMA) standards. Conversions of all monomers were determined with known concentrations of polymers in THF. $^1$H NMR spectra were recorded in CDCl$_3$ solvent using a Bruker 300 MHz spectrometer with a delay time of 1 s.

General Polymerization Procedures: ATRP.

In a typical experiment, CuBr (41.3 mg, 0.29 mmol) was added to a dried Schlenk flask equipped with a stir bar. After sealing with a rubber septum, the flask was degassed and backfilled with nitrogen (N$_2$) five times and then left under N$_2$. Subsequently, a mixture of styrene (3.00 g, 28.9 mmol), initiator, and ligand was added to a glass vial and degassed by three freeze-pump-thaw cycles. It was then transferred to the Schlenk flask, which was placed in a thermostated oil bath at the desired temperature. Samples were taken periodically under N$_2$ using an N$_2$-purged syringe, diluted by THF to a known concentration, passed through a column filled with neutral alumina to remove the copper complex, and analyzed by GPC.

General Polymerization Procedures: RAFT.

The RAFT agent (22.9 mg), AIBN (6.0 mg), and Styrene (1.50 g) in anisole (50% (v/v) of total volume) was added to a dried Schlenk flask equipped with a stir bar. The flask was degassed by three freeze-pump-thaw cycles then placed in a thermostated oil bath set at the desired temperature. Samples were taken periodically under N$_2$ atmosphere using a N$_2$-purged syringe, mixed with THF, passed through a column filled with neutral alumina to remove the copper complex, and analyzed by GPC.

Typical Procedure for Measurement of Activation Rate Constant (k$_a$) and Equilibrium Constant (K$_{ATRP}$), (CuBr/PMDETA with MMADC).

The experimental procedure used to determine the values of k$_a$ and K$_{ATRP}$ by UV is similar to that provided in previous publications detailing the determination of k$_a$ or K$_{ATRP}$. To measure k$_a$, CuBr/PMDETA (10.0 mM) and TEMPO (10.0 mM, without TEMPO in the case of K$_{ATRP}$ measurement) and MeCN were mixed in a Schlenk flask joined to a quartz UV cuvette and the flask was transferred to a Cary 5000 UV/VIS/NIR spectrometer (Varian). The degassed MMADC (1.0 mM) was injected via a N$_2$-purged syringe. The absorbance at a wavelength corresponding to the λ$_{max}$ of the generated Cu$^{II}$ deactivator complex was monitored at timed intervals. The concentration of the deactivator generated in the system was calculated using values of the extinction coefficients for the Cu$^{II}$ complexes determined separately. Other combinations of initiators and Cu$^I$ complexes were studied in a similar fashion.

End-Group Analysis by Model Reaction.

CuBr (50 mM) was added to a dried Schlenk flask equipped with a stir bar, after sealing with a rubber septum, the flask was degassed and backfilled with N$_2$ five times and then left under N$_2$. Subsequently, the mixture of PMDETA (50 mM) in MeCN-d$_3$ was added to a glass vial and degassed by three freeze-pump-thaw cycles. The solution was then transferred to the Schlenk flask and stirred until all CuBr dissolved. Degassed MANDC (50 mM) was injected and the flask shaken. The mixture was transferred to an NMR tube end-sealed with a rubber septum, and the NMR spectrum measured. End-group analysis with CuDC was carried out by a method similar to the one described above.

To further confirm and analyze, the composition of the chain-end was followed by $^1$H NMR in low-mass and polymer model systems. First, MANDC, CuBr, and PMDETA (50 mM, respectively) were mixed in MeCN-d$_3$ in an NMR tube and measured by $^1$H NMR. All the peaks of MANDC, a (1.89-1.91 ppm), b (3.61-4.11 ppm), and c (1.22-1.39 ppm), remained constant. Apparently, no change was observed in NMR spectra within 24 h at room temperature. The result indicates that MANDC was activated to give MAN radical and DCCu$^{II}$Br complex but this radical was deactivated by not by Br but by DC group in the deactivator. In other word, above experiment demonstrate no halogen exchange was occurred between DC in the initiator and Br in the catalyst.

Figure 5A:
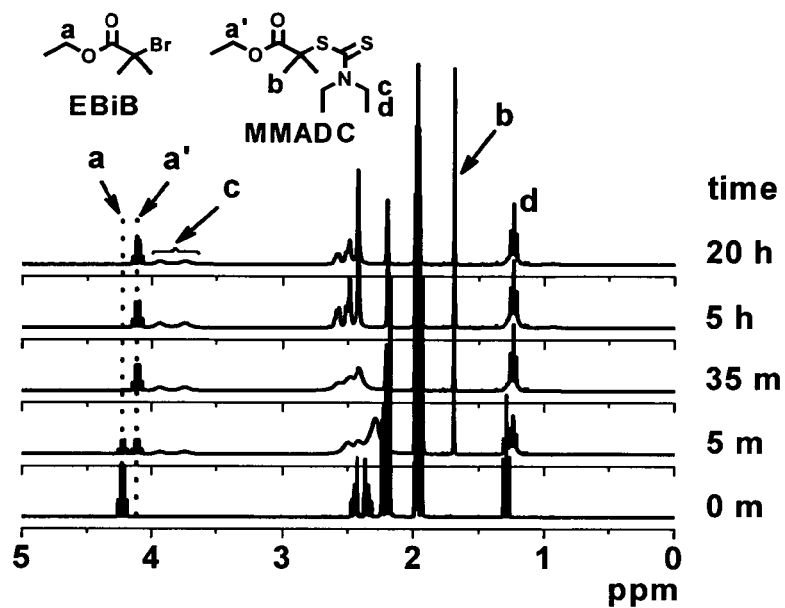
FIGS. 5(a) and 5(b). 5(a) $^1$H NMR spectra for the mixture of EBiB, CuDC, and PMDETA in acetonitrile-$d_3$ under $N_2$ atmosphere (room temperature): $[EBiB]_0=[CuDC]_0=[PMDETA]_0=50$ mM and 5(b)$^1$H NMR (in $CDCl_3$) spectroscopy of PSt macroinitiator ($M_n$=1900, $M_w/M_n$=1.06) prepared with the St/EMADC/CuBr/PMDETA (=100/1/2/6) in bulk at 120° C.

Next, EBiB, CuDC, and PMDETA (50 mM, respectively) were mixed and followed by $^1$H NMR (FIG. 5a). A spectrum at time zero was measured in the presence of EBiB and PMDETA. As time went by, the peak at 4.2 ppm corresponds to a in EBiB gradually decreased to almost disappear at 35 min, while, the peak at 4.1 ppm corresponds to a' at MMADC gradually increased. Because no MMADC was added initially, these phenomena indicate that EBiB is activated by CuDC complex then the DC group in the catalyst replaces Br in EBiB. The above results obviously show that the DC group exists at the chain end whether bromide or DC initiator is used, carbon radical prefers halogen to DC, and copper complex favors DC over halogen.

Figure 5B:
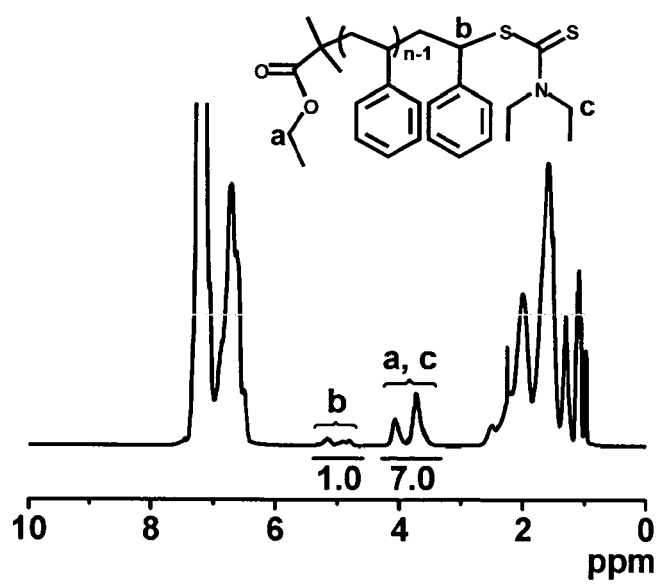

The end-group of polymer chain was also analyzed. A polystyrene macroinitiator (M$_n$=1 900, M$_w$/M$_n$=1.06) dissolved in CDCl$_3$ was measured by $^1$H NMR (FIG. 5b). The peaks at 3.6-4.1 ppm are due to the mixture of methylene protons, a and c, of the MMADC initiator. The peaks 4.8-5.2 ppm correspond to the methine proton, b, adjacent to the terminal DC group. The ratio of the peaks at 3.6-4.1 ppm (a+c) to the peaks at 4.8-5.2 ppm (b) is 7:1, which is quite close to the theoretical value 6:1. This result confirms the existence of DC group at the polymer chain end.

CTA syntheses.

(CTA a) CuBr (23.4 mg, 41 mM) and Cu(0) (425 μm, 51.9 mg, 205 mM) were added to a dried Schlenk flask equipped with a stir bar. The flask was degassed and backfilled with nitrogen (N$_2$) five times and then left under N$_2$. Subsequently, a mixture of bis(thiobenzoyl) disulfide (100 mg, 82 mM), EBiB(127.5 mg, 164 mM), PMDETA (56.6 mg, 82 mM), and toluene 4 mL was added to a glass vial and degassed by three freeze-pump-thaw cycles. This solution was then transferred to the Schlenk flask, which was placed in a thermostated oil bath at 80° C. Samples were taken periodically under N$_2$ atmosphere using a N$_2$-purged syringe, passed through a short column filled with neutral alumina to remove the copper complex, and analyzed by $^1$H NMR after removing solvent.
Synthesis of Iniferter Initiators.

The novel diethyldithiocarbamate (DETC) initiators are prepared by converting a halogen present on a standard ATRP initiator to the desired dithiocarbamate initiator. This demonstrates a facile method for transformation of the active transferable end group in any ATRP reaction to a non-halogen end group suitable for other chemistries.

Cyanomethyl diethyldithiocarbamate (CMDC), 1-cyanoethyl dithiocarbamate (ANDC), 1-cyano-1-methylethyldiethyldithiocarbamte (MANDC), 2-(N,N-diethyldithiocarbamyl)-isobutyric acid ethyl ester (MMADC), and methyl ([(diethylamino) carbonothioyl]thio)(phenyl)acetate (MPADC) (Scheme 7) were synthesized as follows.

CMDC: was prepared according to the previously reported literature procedures (see Otsu, T.; Matsunaga, T.; Doi, T.; Matsumoto, A. *Eur. Polym. J.* 1995, 31, 67-78). The sodium salt of N,N-diethyldithiocarbamate (NaDC), 8.80 g (1.2 eq.), was added to a solution of 3.00 g (1 eq.) of 2-bromoacetonitrile in 200 mL of acetone and the reaction mixture was stirred at 40° C. for 16 h. The white precipitate was removed by filtration, and acetone was evaporated from the mixture. The residue was dissolved in benzene and any insoluble solid was again removed by filtration, after which the benzene was removed by evaporation. The crude oil was distilled under reduced pressure at 103-105° C. (1 mmHg) to obtain a light yellow viscous liquid. Purity (>98%) was determined by $^1$H NMR. $^1$H NMR (CDCl$_3$, δ, ppm): 4.25 (s, 2H), 3.65-4.15 (m, 4H), 1.25-1.45 (s, 6H).

ANDC: 5 g of 2-bromopropionitrile and 10.10 g of NaDC were used in a procedure similar to that described above providing a crude oil which was distilled at 105-110° C. (1 mmHg), purity was ca. 97%. $^1$H NMR (CDCl$_3$, δ, ppm): 4.95-5.05 (q, 1H), 3.64-4.08 (m, 4H), 1.71-1.75 (d, 1H), 1.24-1.37 (s, 6H).

MMADC: 5 g (1 eq.) of ethyl 2-bromoisobutyrate and 6.94 g (1.2 eq.) of NaDC was also used in a similar procedure providing a crude oil which was distilled at 115-125° C. (1 mmHg) to give a light yellow viscous liquid, purity was ca. 98%. $^1$H NMR (CDCl$_3$, δ, ppm): 4.15-4.28 (q, 2H), 3.62-4.06 (m, 4H), 1.71-1.78 (s, 6H), 1.19-1.37 (s, 9H).

MANDC: Tetraethylthiuram disulfide, 9.03 g (1.00 eq.) was added to a solution of 7.5 g (1.5 eq.) of AIBN in 100 mL of toluene and the reaction mixture was bubbled with nitrogen for 30 min and then stirred at 55° C. for 65 h. The white precipitate was removed by filtration, and toluene was removed by evaporation from the mixture. The crude oil was distillated under reduced pressure, 107-115° C. 1 mmHg, providing a light yellow viscous liquid, purity over 97%. $^1$H NMR (CDCl3, δ, ppm): 3.61-4.11 (m, 4H), 1.89-1.98 (s, 6H), 1.22-1.39 (s, 6H).

MPADC: NaDC, 3.25 g (1.10 eq.), was added to a solution of 3.00 g (1.00 eq.) of methyl α-bromophenylacetate in 100 mL of acetone and the reaction mixture was stirred at r. t. for 5 h. The white precipitate was removed by filtration, and acetone was evaporated from the mixture. The crude mixture was dissolved in benzene and any insoluble solid was removed by filtration after which the mixture was kept at −10° C. overnight and the white precipitation was again removed by filtration. The filtrate was evaporated to dryness, purity was ca. 98%. $^1$H NMR (CDCl$_3$, δ, ppm): 7.29-7.51 (m, 5H), 5.84 (s, 1H), 3.62-4.09 (m, 4H), 3.38 (s, 3H), 1.25-1.39 (s, 6H).

Chain Transfer Agents Syntheses via ATRAF

The results are reported above in table 1. The reaction conditions are: R—X/disulfide/CuBr/PMDETA/Cu(0)=2/1/0.5/1/2.5 (205 mM) in toluene at 80° C. for 6 hours or R—X/disulfide/CuBr/PMDETA/Cu(0)=2/1/0.05/0.1/2.2 (1.2 M) in acetone for 18 hours at room temperature.

Synthesis of Hydroxyethyl 2-Bromoisobutyrate:

Anhydrous ethylene glycol (301.3 g, 4.85 mol) and triethylamine (28 mL, 200 mmol) were diluted with dry tetrahydrofuran (100 mL). The reaction mixture was cooled in an ice-water bath and a solution of α-bromoisobutyryl bromide (12 mL, 97.1 mmol) in dry tetrahydrofuran (50 mL) was slowly added while stirring. The mixture was stirred in the cooling bath for 1 h and then at room temperature for 16 h. The reaction mixture was then poured into water (800 mL) and extracted with dichloromethane (6×100 mL). The organic fractions were combined, washed with acidic water (pH=4), dried over MgSO$_4$ and evaporated to dryness to afford 17.477 g (yield=85.3%) of a very pale yellow liquid. $^1$H NMR (CDCl$_3$, δ, ppm): 4.30-4.19 (m, 2H), 3.86-3.75 (m, 2H), 2.86-2.47 (broad peak, 1H, OH), 1.89 (s, 6H). $^{13}$C NMR (CDCl$_3$, δ): 171.95, 67.40, 60.63, 55.89, 30.72.

Synthesis of S,S'-bis[4-(6-bromoisobutyrate)ethyl isobutyrate]-trithiocarbonate (DiBrTTC)

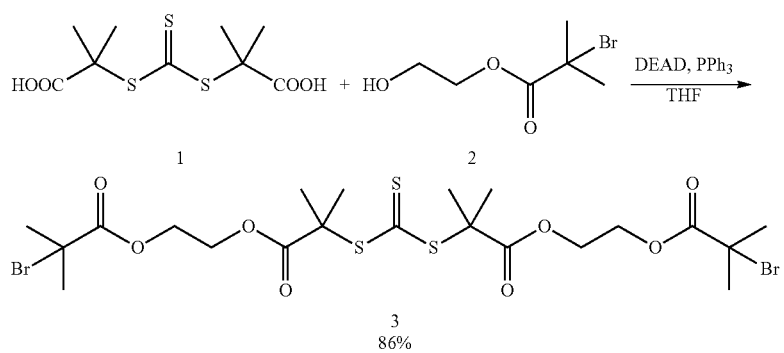

A 100-mL round bottomed flask equipped with a dropping funnel was charged with S,S'-Bis(α,α'-dimethyl-α"-acetic acid)-trithiocarbonate (2.115 g, 7.5 mmol), hydroxyethyl 2-bromoisobutyrate (5.065 g, 24 mmol), triphenylphosphine (6.295 g, 24 mmol) then purged with nitrogen. 40 mL of anhydrous tetrahydrofuran was then added. The flask was immersed in an ice bath, and diethyl azodicarboxylate (DEAD) (3.779 mL, 24 mmol) in 10 mL of dry THF was added dropwise at a rate such that the temperature of the reaction mixture is maintained below 10° C. Upon completion of the addition, the flask was removed from the ice bath and the solution was allowed to stir at room temperature overnight (16 hr) and subsequently at 40° C. for 3 hr. The reaction mixture was cooled to room temperature, diluted with 150 mL of dichloromethane and washed twice with 25 mL portions of saturated aqueous sodium bicarbonate solution. The aqueous layers were combined and back-extracted with 100 mL of dichloromethane. The combined organic layers were dried over magnesium sulphate and concentrated under vacuum. The product was purified by column chromatography (eluent:hexanes/ethyl acetate: 9/1) to afford 4.309 g (yield=85.9%) of a yellow solid. $^1$H NMR (CDCl$_3$, δ, ppm): 4.40-4.29 (m, 8H), 1.92 (s, 12H), 1.66 (s, 12H). $^{13}$C NMR (CDCl$_3$, δ): 218.82, 172.50, 171.49, 63.47, 63.24, 56.28, 55.50, 30.84, 25.21.

Comparator 1:

The improved process disclosed herein can be demonstrated by initially conducting a thermal iniferter polymerization of styrene as a comparator example. The polymerization was carried out at 120° C. with a ratio of St/MMADC=100/1. It can clearly be observed in FIG. 3 that the number-average molecular weight (M$_n$) of the polymer formed in this reaction does not increase linearly with conversion when MMADC is used as a thermal initiator, but actually decreases as a function of conversion furthermore the polydispersity of the formed polymer increases with conversion.

Figure 6:
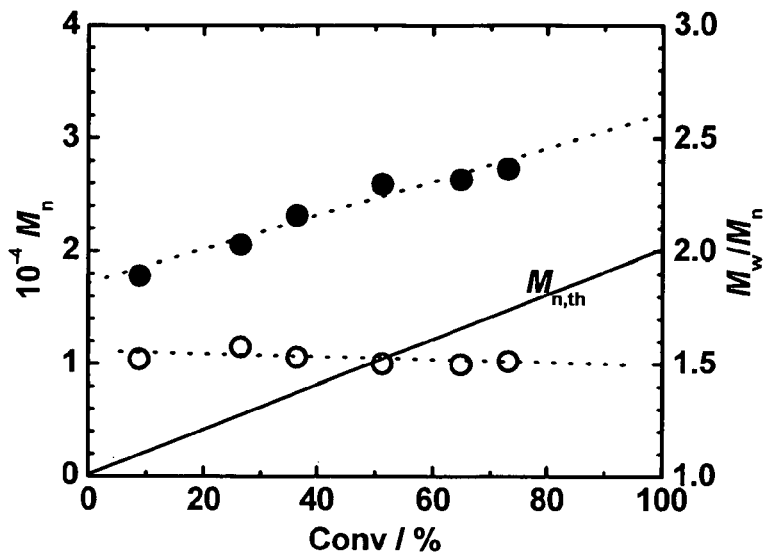
FIG. 6. Dependence of number average molecular weight, $M_n$ (•), and polydispersity, $M_w/M_n$ (o), vs percent conversion for the bulk polymerization of MMA at 100° C. with MMADC initiator: MMA/MMADC/CuBr/bpy=200/1/1/2.

Comparator 2:

As a further comparator to show the unexpected improvement of the disclosed process the polymerization MMA was carried out at 100° C. with a ratio of MMA/MMADC/CuBr/bpy=200/1/1/2. FIG. 6 shows that M$_n$ increases linearly with conversion but has a significantly higher value than the theoretical value and the M$_w$/M$_n$ remained fairly high (ca. 1.5) throughout the polymerization. This type of behavior is in accordance with known ATRP reactions that display incomplete initiation and slow deactivation. Generally in ATRP the effects of slow deactivation can be decreased by the addition of oxidized form of catalyst, such as the CuBr$_2$ based complex. However, adding CuBr$_2$ to this polymerization brought no improvement on the level of control in the polymerization. The reason is as discussed above: the DC group in the DCCu$^{II}$Br deactivator catalyst complex prefers transfer to the carbon-centered radical than the second Br in CuBr$_2$ does. Therefore, DC group in DCCu$^{II}$Br will preferentially deactivate propagating radical rather than Br in CuBr$_2$ does. This is the reason why no improvement was shown by the intentional addition of CuBr$_2$.

Example 1

Styrene Polymerization

Ratio of reagents=[St]/[MMADC]/[Cu$^I$Br]/[PMDETA]=100/1/2/6 at 120° C. As polymerization starts, the color of reaction gradually changes from colorless to green. The results of St polymerization using MMADC, Cu$^I$Br, and PMDETA are included in FIG. 4. A linear increase of number average molecular weight (M$_n$) versus monomer conversions up to 90% was found after ca. 330 min at 120° C. (FIG. 4a).

The M$_n$ is very close to the theoretical one, M$_{n,th}$, calculated by eq 1.

$$M_{n,th} = ([St]_0/[DCIA]_0) \times M.W. \times conversion \quad (1)$$

This indicates that MMDAC acts as an efficient initiator and the number of chains is constant. The molecular weight distribution is very narrow (M$_w$/M$_n$=ca. 1.1) FIG. 4b. A linear plot of ln([M]$_0$/[M]) versus polymerization time indicates that the concentration of growing radicals remains constant during polymerization and termination is not significant. GPC chromatograms displayed narrow monomodal peaks gradually shifting to higher molecular weight suggesting a living polymerization with negligible amount of unfavorable side reactions or termination.

End-Group Analyses and Chain Extension.

To confirm and analyze the composition of the growing terminal chain end, the change in composition of the chain-end was followed using $^1$H NMR in low-molar mass and polymer model systems. All the peaks attributable to MANDC remained constant over 24 hours at room temperature indicating that MANDC was activated to generate a MAN radical and DCCu$^{II}$Br complex but this radical was deactivated by reverse transfer of the DC group in the higher oxidation state transition metal complex not by transfer of the Br atom. In other words, demonstrating no halogen exchange occurred between the DC initially present in the initiator and the Br initially present in the catalyst.

To further confirm that the growing chain end is preferentially deactivated by transfer of the DC-group EBiB, CuDC, and PMDETA were mixed and the reaction was followed by $^1$H NMR. A spectrum at time zero was measured in the presence of EBiB and PMDETA. As time went by, the peak corresponding to EBiB gradually decreased and had almost disappeared after 35 min, while, the peak which corresponds MMADC gradually increased. Because no MMADC was added initially, these observations indicate that EBiB is activated by CuDC complex then the DC group in the catalyst replaces the Br group originally present in EBiB.

The above results show that the DC group preferentially exists at the chain end whether a bromine or DC based initiator is used. The formed carbon radical prefers to be deactivated by transfer of the DC group rather than halogen, and the copper complex favors retention of halogen over DC. The end-group of a formed polymer chain was also analyzed.

Example 1a

Synthesis of a Polystyrene Macroinitiator

CuBr (275 mg) was added to a dried Schlenk flask equipped with a stir bar. After sealing with a rubber septum, the flask was degassed and backfilled with N$_2$ five times and then left under N$_2$. Subsequently, St (10.0 g), PMDETA (0.998 g), and MMADC (253 mg) were added to a glass vial and degassed by three freeze-pump-thaw cycles. The solution was then transferred to the Schlenk flask, which was placed in a thermostated oil bath at 80° C. The polymerization was stopped after 45 min reaction by opening the flask and exposing the catalyst to air. The mixture was diluted with 20 mL dichloromethane and passed through a neutral alumina column. The solution was concentrated by rotary evaporation and the polymer was precipitated by addition to a large amount of cold methanol. Dissolution and precipitation was repeated until a white powder was obtained. The precipitated polymer was dried in a vacuum oven at 40° C. until a constant weight was reached and analyzed by GPC ($M_n$=1900, $M_w/M_n$=1.06).

The polystyrene oligo/macroinitiator ($M_n$=1,900, $M_w/M_n$=1.06) was dissolved in $CDCl_3$ was and the $^1H$ NMR measured. The peaks at 3.6-4.1 ppm due to the mixture of methylene protons, a and c, of the MMADC initiator. The peaks 4.8-5.2 ppm correspond to the methine proton, b, adjacent to the terminal DC group. The ratio of the peaks at 3.6-4.1 ppm (a+c) to the peaks at 4.8-5.2 ppm (b) were quite close to the theoretical value 6:1 confirming the existence of the DC group at the polymer chain end.

Chain Extension of PSt Macroinitiator with St.

The PSt macroinitiator (0.200 g, 0.11 mmol) and PMDETA were dissolved in St (2.22 g, 21.3 mmol) in a 10-mL round bottom flask and subjected to a freeze-pump-thaw cycle three times. This solution was transferred to a Schlenk flask containing degassed CuBr (30.5 mg, 0.21 mmol). The flask was then placed in a thermostated oil bath at 120° C. The polymerization was stopped after 340 min ($M_n$=20 610, $M_w/M_n$=1.08) by opening the flask and exposing the catalyst to air. Examination of the GPC curve showed complete chain extension of the initial polystyrene, forming a polymer with $M_n$=20,600, $M_w/M_n$=1.08, and total absence of any unreacted macroinitiator. This result clearly demonstrates that the DC group at the polystyrene chain end can be extended with styrene, while retaining low PDI.

All above data clearly indicate that there is no exchange between the DC group and the halogen atom in the copper catalyst and DC group is always maintained at the chain end.

Example 1b

ATRP of Styrene with a Decreased Amount of Catalyst

The kinetics of a series of ATRP of styrene at 120° C. using MMADC as initiator with 100, 20, and 10 mol % of catalyst relative to initiator showed linear plots of $\ln([M]_0/[M])$. ATRP with 100 mol-% catalyst is faster than with 20 mol-% one, which is slightly faster than that with 10 mol-% because the activation reaction is faster with an increased amount of catalyst, which results in a higher radical concentration and thereby a faster polymerization rate. The MW of the resulting polystyrene increases linearly with conversion and $M_w/M_n$ is low in both 20 and 100 mol-% catalyst case. The $M_w/M_n$ of polymer formed in the 10 mol-% case was higher than 1.5 at low conversion but it reached 1.3 at full conversion. All MWs are quite close to the theoretical values demonstrating that initiation efficiency of these polymerizations is basically identical. Therefore the ratio of initiator to catalyst can be selected to provide control over the PDI of the formed (co) polymer.

Example: $[St]/[MMDCA]/[Cu^IBr]/[PMDETA]$=1000/1/2/6 at 120° C.

A polymerization of St using MMDCA/$Cu^IBr$ targeting higher molecular weight was conducted. The molecular weight at full conversion would be 100,000 ([St]/[initiator]=1000/1). Monomer conversion vs. time showed a linear first-order plot and molecular weight increased linearly with conversion. Molecular weight was ca. 60,000 at ~70% conversion and polydispersity was fairly low ($M_w/M_n$=1.3).

Example 1c

ARGET ATRP/RAFT of St (DP 3,100) or ARGET Transition Metal Mediated Chain Transfer Agent Polymerization (TMMCTAP)

(CDB is Cumyl Dithiobenzoate) $St/CDB/CuBr/Cu0/Me_6TREN$=3,100/1/0.1/5/0.1 in anisole 50 (v/v) %, 75 h @ 100° C. Conversion=68.1%; $M_{nth}$=212,000 g/mol; $M_n$=128,000 g/mol; $M_w/M_n$=1.28.

Example 1d

ARGET TMMCTAP of St (DP 3,100)

$St/CDB/CuBr/Cu0/TPMA$=3,100/1/0.1/5/0.3 in anisole 50 (v/v) %, 75 h @ 100° C. Conversion=61.9%; $M_{nth}$=193,000 g/mol; $M_n$=102,000 g/mol; $M_w/M_n$=1.30.

Example 1e

ARGET TMMCTAP of St (DP 28,000)

$St/CDB/CuBr/Cu0/TPMA$=27,900/1/0.01/5/0.03 in anisole 20 (v/v) %, 70 h @ 80° C. Conversion=19.4%; $M_{nth}$=563,000 g/mol; $M_n$=282,000 g/mol; $M_w/M_n$=1.44.

Example 2

Polymerization of Methyl Methacrylate

Example 2a

Ratio of Reagents: $[MMA]/[MAMDC]/[Cu^IX]/[bpy]$=200/1/1/2 at 100° C.

Figure 7:
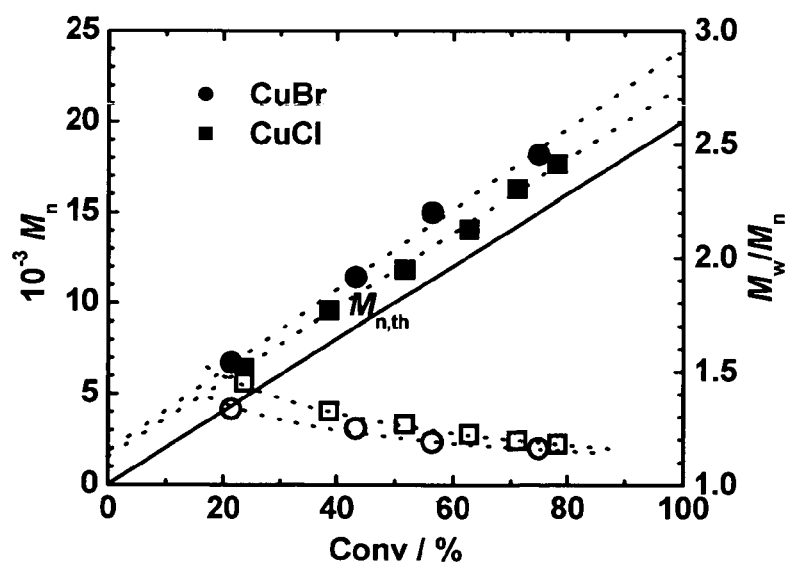
FIG. 7. Dependence of number average molecular weight, $M_n$, and polydispersity, $M_w/M_n$ vs percent conversion for the bulk polymerization of MMA at 100° C. with MANDC initiator: MMA/MANDC/CuBr (or CuCl)/bpy=100/1/1/2.

Two polymerization of MMA were conducted with different copper halide complexes (X=Cl or Br) formed with bpy as ligand. The reaction temperature was set at 100° C. for faster initiation. The results are shown in FIG. 7. In both cases, molecular weights were increased linearly with an increase of conversion maintaining low polydispersities. Molecular weights of PMMA formed using $Cu^ICl$ were closer to theoretical values than those using $Cu^IBr$. However, PDI was slightly lower when $Cu^IBr$ was used as catalyst. FIG. 7 shows the plot of monomer conversion vs time for both cases. Straight lines indicate constant radical concentration, although the one using $Cu^IBr$ showed slightly faster polymerization rate. GPC chromatographs showed regular increases of molecular weight maintaining monomodal peaks and little difference between the catalyst systems.

Example 2b

PMMA-b-PSt Preparation

The PMMA iniferter was used as a macroinitiator for the polymerization of styrene Macroinitiator (entry MI 1-2) and PMMA-b-PSt Synthesis (entry BL 1-2)$^a$

| entry | M/eq. | CTA | V-40 | CuBr/L/Cu(0) | t/h | conv/% | $M_n$ | $M_w/M_n$ |
|---|---|---|---|---|---|---|---|---|
| MI 1 | MMA/80 | CDB | 0.5 | — | 16.5 | 97.0 | 8800 | 1.22 |
| MI 2[b] | MMA/80 | CDB | — | 2/4/0 | 16.5 | 93.2 | 8300 | 1.23 |
| BL 1 | St/1000 | MI 1 | 2 | — | 20.0 | 50.1 | 40,900 | 1.32 |
| BL 2[c] | St/1000 | MI 2 | — | 20/30/10 | 20.0 | 48.4 | 50,600 | 1.20 |

[a]All polymerizations were performed at 80° C.
[b]L = bpy.
[c]L = Me$_6$TREN.

Figure 8:
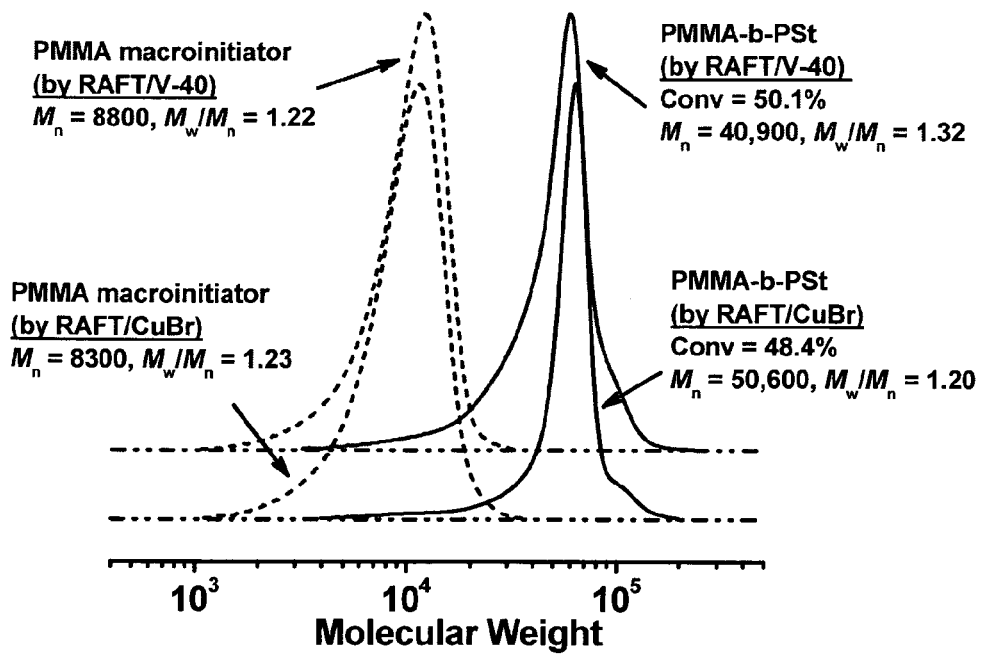
FIG. 8. Comparison of SEC curves for PMMA macroinitiators prepared by standard RAFT procedures and transition metal catalyzed RAFT and SEC curves of block copolymers prepared by chain extension of the macroinitiators by reaction with styrene using same two procedures.

There was successful preparation of purer first block (MI 2) and chain extended block copolymer (BL 2) by CuBr activated RAFT as shown in FIG. 8.

Example 2c

[MMA]/[MAMDC]/[Cu$^I$X]/[bpy]=1000/1/1/2 at 100° C.

Targeted molecular weight at full conversion is 100,000. Monomer conversion vs. time showed first-order plot passing through the origin. Molecular weight increased linearly with conversion and was very close to the theoretical line ($M_{n,th}$). Molecular weight was ca. 66,000 at 67% conversion and polydispersity was very low ($M_w/M_n$=1.2) throughout the polymerization. GPC chromatogram shows monomodal peaks with a small amount of tailing at lower molecular weight region.

High molecular weight PMMAs have been prepared using RAFT/ATRP or TMMCTAP. Good control was obtained with both Me$_6$TREN and TPMA as ligand and cumyl dithiobenzoate (CDB) as inifer.

Example 2d

ARGET TMMCTAP of MMA (DP 14,000)

Several runs were conducted targeting higher molecular weight PMMA with different Cu complexes.

MMA/CDB/CuBr/Cu0/Me$_6$TREN=14,000/1/0.1/5/0.3 in anisole 66 (v/v) % at 80° C. Conversion=70.7%; $M_{nth}$=991,000 g/mol; $M_n$=890,000 g/mol; $M_w/M_n$=1.30

MMA/CDB/CuBr/Cu0/TPMA=14,000/1/0.1/5/0.3 in anisole 66 (v/v) % @ 80° C. Conversion=66.2%; $M_{nth}$=928,000 g/mol; $M_n$=739,000 g/mol; $M_w/M_n$=1.27 Both runs were well controlled providing high molecular weight polymers.
ARGET ATRP/RAFT of MMA: (DP=30,000)

MMA/CDB/CuBr/Cu0/TPMA=30,000/1/0.1/5/0.3 in anisole 33% (v/v) % at 80° C. Conversion=35.4%; $M_{nth}$=1,060,000 g/mol; $M_n$=912,000 g/mol; $M_w/M_n$=1.24
ARGET ATRP/RAFT of MMA: (Lower Concentration of Catalyst)

MMA/CDB/CuBr/Cu0/TPMA=30,000/1/0.01/5/0.03 in anisole 50 (v/v) % at 80° C. Conversion=43.9%; Mnth=1,320,000 g/mol; Mn=1,250,000 g/mol; Mw/Mn=1.21 For the first experiment, a higher monomer concentration was used, compared to what had been previously conducted (33% anisole in volume compared to 75% and 66% previously). In the second experiment, a lower ratio CDB/CuBr was used (10 times lower than previously). Both systems gave good control. Decreasing the catalyst concentration allowed a slower polymerization and therefore decreased the amount of termination. In both cases, the polymerization had to be stopped at moderate conversion due to the high viscosity of the solution. Kinetic plots indicate a constant radical concentration over the course of the reactions. The experimental MW increases linearly with conversion and is in good agreement with the theoretical MW. The PDI decreases with conversion down to 1.20-1.25. SEC traces cleanly shift to higher molecular weight with the progress of the reaction and are monomodal.

Example 2e

Preparation of Block Copolymer with High Molecular Weight Segments

First Block: PMMA
MMA/CDB/CuBr/Cu0/TPMA=2,000/1/0.01/5/0.03 in anisole 66 (v/v) %, 32 h @ 80° C. Conversion=61.1%; $M_{nth}$=123,000 g/mol; $M_n$=112,000 g/mol; $M_w/M_n$=1.08
Second Block: PBMA
BMA/PMMA/CuBr/Cu0/TPMA=30,300/1/0.01/5/0.03 in anisole 50 (v/v) %, 92 h @ 80° C. The molecular weight of the block copolymer was ~1,400,000 with narrow $M_w/M_n$=1.2.

This has not been accomplished before in any CRP procedure.

Example 3

Photo-Induced ATRP of MMA in the Presence of DC Initiator

UV Spectra of DC Initiators. UV spectra of MMADC and MANDC were recorded with 0.1 mM concentrations in MeCN and UV absorptions were observed at 250-310 nm in both cases and the maximum peaks were observed at ca. 280 nm wavelength.

Example 3a

A Standard ATRP of MMA with MMADC as Initiator

A comparator polymerization was carried out at 100° C. by introducing MMADC, CuBr, and bpy and a mole ratio of reagents ([MMA]/[MMADC]/[CuBr]/[bpy]=200/1/1/2. There was poor initiation efficiency and the resulting polymer had broad PDI.

Example 3b

Photo-ATRP of MMA.

Polymerization was carried out at room temperature by introducing MMADC, CuBr, and bpy and a mole ratio of reagents ([MMA]/[MMADC]/[CuBr]/[bpy]=200/1/1/2. The photo-induced ATRP was performed by irradiating the whole region of UV light (mercury lamp HBO 200 W) in the 15 cm-distance. Samples were taken periodically and showed that molecular weight increased linearly with an increase of conversion and it was almost identical to the theoretical molecular weight. The PDI value was below 1.5 from an early stage of polymerization and was <1.2 at later stage of polymerization (ca. 70%) demonstrating that the ATRP of MMA in the presence of DC initiator was greatly improved by the application UV light to the flask.

Example 3c

Photo-ATRP of MMA (Decreased Amount of Catalyst)

The polymerization was carried out at room temperature under the UV irradiation with a ratio of [MMA]/[MMADC]/[CuBr]/[bpy]=200/1/0.1/0.2. This experiment was carried out to study how much amount of catalyst is enough to synthesize well-defined polymer with low polydispersity. PMMA which was produced after 20.5 h at room temperature had $M_n$ of 5890 ($M_w/M_n$=1.532) at 25.0% conversion. The $M_n$ was fairly close to the theoretical value ($M_n$=5000 at 25.0% conversion).

Example 3d

Photo-ATRP of MMA with Various Ligands

N-(n-propyl)-2-pyridylethanimine. The polymerization was carried out at room temperature under the UV irradiation with a ratio of [MMA]/[MMADC]/[CuBr]/[N-(n-propyl)-2-pyridylethanimine]=200/1/0.1/0.2. The aim of this experiment is to investigate how ligand, N-(n-propyl)-2-pyridylethanimine, which a less active catalyst complex in normal ATRP, effects on polymerization. PMMA had $M_n$ of 24,930 at 21.5 h reaction ($M_w/M_n$=1.358 at 81.3% cony.). $M_n$ was higher than the theoretical value ($M_{n,th}$=16,300 at 81.3% cony.) and polydispersity was slightly high. The $M_n$ of a similar experiment using bpy was very close to theoretical value and polydispersity was 1.155 at 72.0% conversion. Although the controllability of polymerization was slightly poorer, this experiment suggests a possibility of photo-induced ATRP of MMA using pyridylimine as a ligand.
HMTETA.
The polymerization was carried out at room temperature under UV irradiation with a ratio of [MMA]/[MMADC]/[CuBr]/[HMTETA]=200/1/1/1. The PMMA which was produced after 5 h 20 min. had $M_n$ of 26,320 ($M_w/M_n$=1.210) at 71.0% conversion which is higher than the theoretical value ($M_n$=14,200 at 71.0% conversion) but the polydispersity was fairly low. This is because HMTETA acts as a good deactivator and the initiation efficiency of MMADC is low. Photo polymerization of MMA using HMTETA with active initiators, such as MANDC, would produce well-controlled polymer.

Example 4

Controlled Polymerization using Dual Process Functional Initiator

The dual process functional initiator is exemplified by dibromotrithiocarbonate (DiBrTTC) inifer that allows:
  polymerizing by RAFT only (for acrylates and styrenics);
  ATRP only for MMA: via both the bromine chain ends and the TTC moiety depending on selection of ligands;
  CuBr/PMDETA or CuBr/dNbpy for example (ATRP Br and ATRP S), or via the bromine chain ends only with CuBr/TPMA (ATRP Br) or:
  polymerizing by RAFT and ATRP concurrently for acrylates and styrenics

Example 4a

RAFT Polymerization of Acrylates with DiBrTTC

In a typical experiment, DiBrTTC (133.7 mg, 0.2 mmol), AIBN (1.64 mg, 0.01 mmol) and anisole (1 mL) were charged to a flask and bubbled with $N_2$ for 30 minutes. Deoxygenated MA (2 mL, 22.21 mmol) was added and an initial sample was taken. The flask was placed in an oil bath thermostated at 70° C. for 2 hours. At timed intervals, samples were withdrawn via a syringe for measurement of monomer conversion and polymer molecular weight by gas chromatography (GC) and size SEC, respectively. The polymerization was stopped by quenching the reaction in an ice bath ($M_n$=8,150 g/mol, $M_w/M_n$=1.10, conversion=91.8%).

Example 4b

RAFT Polymerization of St with DiBrTTC

In a typical experiment, DiBrTTC (97.2 mg, $1.455 \times 10^{-1}$ mmol) and styrene (5 mL, 43.6 mmol) were charged to a flask and bubbled with $N_2$ for 30 minutes. The flask was placed in an oil bath thermostated at 130° C. for 11 hours. At timed intervals, samples were withdrawn via a syringe for measurement of monomer conversion and polymer molecular weight by gravimetry and SEC, respectively. The polymerization was stopped by quenching the reaction in an ice bath ($M_n$=12,300 g/mol, $M_w/M_n$=1.16, conversion=39.3%).

Example 4c

ATRP of MMA with Dibromo-trithiocarbonate

In a typical experiment, CuBr (10.8 mg, 0.075 mmol), $CuBr_2$ (1.7 mg, $7.5 \times 10^{-3}$ mmol), 4,4'-dinonyl-2,2'-bipyridyne (67.4 mg, 0.165 mmol) and dibromo-trithiocarbonate (50.1 mg, 0.075 mmol) were charged to a flask and purged with N2 for 30 minutes. Anisole (4 mL) and MMA (4 mL, 37.4 mmol) were added and the solution turned brown as complex formation occurred. An initial sample was taken and the flask was placed in an oil bath thermostated at 90° C. for 3 hours. At timed intervals, samples were withdrawn via a syringe for measurements of monomer conversions and polymer molecular weights by GC and SEC, respectively. The polymerization was stopped via exposure to air and dilution in THF (Mn=41,300 g/mol, Mw/Mn=1.21, conversion=82.3%).

Example 4d

General Procedure for Polymer Methanolysis

Figure 9:
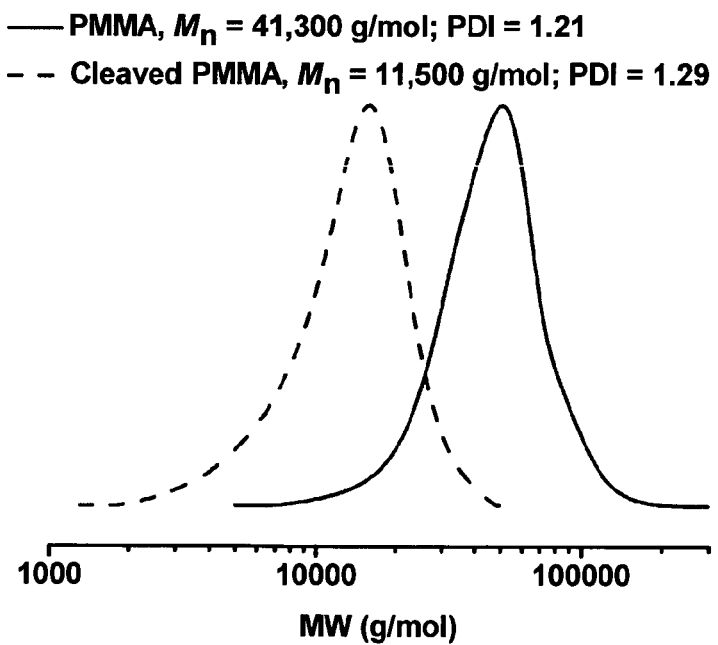
FIG. 9. SEC traces of PMMA prepared by ATRP with CuBr/dNbpy before and after methanolysis with sodium methoxide.

A 41.3 mg sample ($1 \times 10^{-6}$ mol) of the PMMA prepared in the previous example was added to an oven dried 10 mL Schlenk flask equipped with a condenser was charged with, and deoxygenated for 25 min with nitrogen. Anhydrous tetrahydrofuran (4 mL) and sodium methoxide solution 25 wt. % in methanol (2 mL, 8.75 mmol) were added and the solution was refluxed for 16 hours. The reaction mixture was cooled and 10 mL of 1M HCl was added. The organic phase was washed with water (until it became acid free), dried over $MgSO_4$ and the solvent was evaporated. The crude product was redissolved in THF and analyzed by SEC ($M_n$=11,525 g/mol, $M_w/M_n$=1.29). See FIG. 9.

Example 4e

Simultaneous ATRP and RAFT Polymerization of St and Acrylates with DiBrTTC

In a typical experiment, CuBr (51.6×1 g, 0.36 mmol) and CuBr$_2$ (8.9×10$^{-3}$ g, 0.04 mmol) were charged to a flask and purged with N$_2$ for 30 minutes. Anisole (6 mL) and PMDETA (83.6×10$^{-3}$ mL, 0.4 mmol) were added and the solution turned green as complex formation occurred. A solution of DiBrTTC (133.7×10$^{-3}$ g, 0.2 mmol) in styrene (11.46 mL, 100 mmol) was added and an initial sample was taken. The flask was placed in an oil bath thermostated at 90° C. for 19 hours. At timed intervals, samples were withdrawn via a syringe for measurement of monomer conversion and polymer molecular weight by GC and SEC, respectively. The polymerization was stopped via exposure to air and dilution in THF ($M_n$=36,750 g/mol, $M_w/M_n$=1.63, conversion=68.1%).

Example 4f

General Procedure for Polymer Aminolysis

In a typical experiment, polystyrene ($M_n$=36,750 g/mol, $M_w/M_n$=1.63, 92 mg, 2.5×10$^{-6}$ mol) was dissolved in a solution of ethylenediamine (0.17 mL, 2.5 mmol), triethylamine (1.4 μL, 0.01 mmol), and tetrahydrofuran (10 mL). The solution was stirred at room temperature for 72 hours and the polymer was analyzed by SEC without purification ($M_n$=18,500 g/mol, $M_w/M_n$=1.28).

Example 5

Sequential Polymerization Using Vinyl Acetate (VAc) as a Monomer

This reaction can be conducted with a mono-(Scheme 9) or di-haloxanthate inifer and the first controlled polymerization can form a poly(vinyl acetate) macroinitiator for a controlled polymerization reaction through transfer of the halide group or the reverse approach can be conducted. The final block copolymer prepared by successive reversible addition—fragmentation chain transfer (RAFT) polymerization and atom transfer radical polymerization (ATRP) displays low polydispersity ($M_w/M_n$<1.25).

Example 5a

ATRP of MMA, MA and St with Bromoxanthate Inifer

The ratio of reagents added to the reaction and the molecular parameters of the product are shown in the following table and the reaction conditions are reported below the table.

| M | M/a/Cu0/CuBr/CuBr2/L | Ligand | conv. (%) | $M_{n,th}$ | $M_{n,GPC}$ | $M_w/M_n$ |
|---|---|---|---|---|---|---|
| MMA[a] | 500/1/0/1/0.1/2.2 | dNbpy | 76.3 | 38,600 | 39,900 | 1.25 |
| MA[b] | 500/1/1/0/0/1 | Me6TREN | 68.7 | 29,900 | 28,800 | 1.21 |
| St[c] | 150/1/1/0/0/1 | PMDETA | 49.7 | 7,700 | 8,800 | 1.35 |

[a]MMA/anisole = 1/1 v/v, 90° C., 10 h;
[b]MA/acetone = 1/1 v/v, 25° C., 3 h;
[c]bulk, 40° C., 2 h 45.

Example 5b

RAFT of VAc with Bromoxanthate MacroInifer

The PMMA, PMA and PS macroinifers were used to polymerize vinyl acetate using the RAFT pr CTA functionality.

| MI; $M_n$; $M_w/M_n$ | Time (h) | Conv (%) | $M_{n,th}$ | $M_{n,GPC}$ | $M_w/M_n$ |
|---|---|---|---|---|---|
| PMMA; 7,650; 1.26[a] | 70 | 1.1 | 8,600 | 8,800 | 1.21 |
| PMA; 5,200; 1.36[b] | 11 | 40.6 | 12,200 | 12,900 | 1.31 |
| PS; 8,050; 1.42[c] | 47 | 2.3 | 8,550 | 8,350 | 1.50 |

[a]VAc/PMMA/AIBN = 1,000/1/1, bulk, 60° C.;
[b]VAc/PMA/AIBN = 200/1/0.3, VAc/anisole = 1/2 v/v, 60° C.;
[b]VAc/PS/AIBN = 200/1/0.3, VAc/anisole = 1/2 v/v, 60° C.

The chain extension progressed with the GPC curves for the PMA-b-PVA block copolymer moving cleanly to higher MW.

Example 5c

Vinyl Acetate polymerization with Bromoxanthate Inifer

Two different bromoxanthate inifers were used for the polymerization of vinyl acetate to prepare PVAc macroinifer-ter for ATRP of exemplary (meth)acrylate and styrene monomer. One with a secondary halogen (b) and the other a tertiary halogen (a).

| BX | VAc/BX/AIBN | Time/h | Conv. (%) | $M_{nth}$ | $M_{nexp}$ | $M_w/M_n$ |
|---|---|---|---|---|---|---|
| b[a] | 245/1/0.5 | 14 | 38.8 | 8,550 | 8,350 | 1.29 |
| a[b] | 200/1/0.2 | 50 | 4.7 | 1,200 | 840 | 1.33 |

[a]bulk 60° C.;
[b]VAc/anisole = 1/4 v/v, 60° C.

The kinetic plots of conversion were linear and the GPC curves showed that monomodal distributions that cleanly moved higher molecular weight with conversion.

Example 5d

ATRP of MA and St with P(VAc) Macroinifer

| M | M/PVAc/ Cu0/CuBr/ CuBr2/L[a] | Ligand | Conv (%) | $M_{nth}$ | $M_{nexp}$ | $M_w/M_n$ |
|---|---|---|---|---|---|---|
| St[b] | 525/1/0/ 0.9/0.1/1 | PMDETA | 44.2 | 27,100 | 30,700 | 1.20 |
| MA[c] | 1,200/1/ 1/0/0/1 | Me6TREN | 64.2 | 69,300 | 79,600 | 1.14 |

[a]PVAc: Mn = 2,950 g/mol and Mw/Mn = 1.26;
[b]St/anisole = 1/1 v/v, 90° C., 22 h;
[c]MA/DMSO = 1/1 v/v, 25° C., 20 min.

Figure 10:
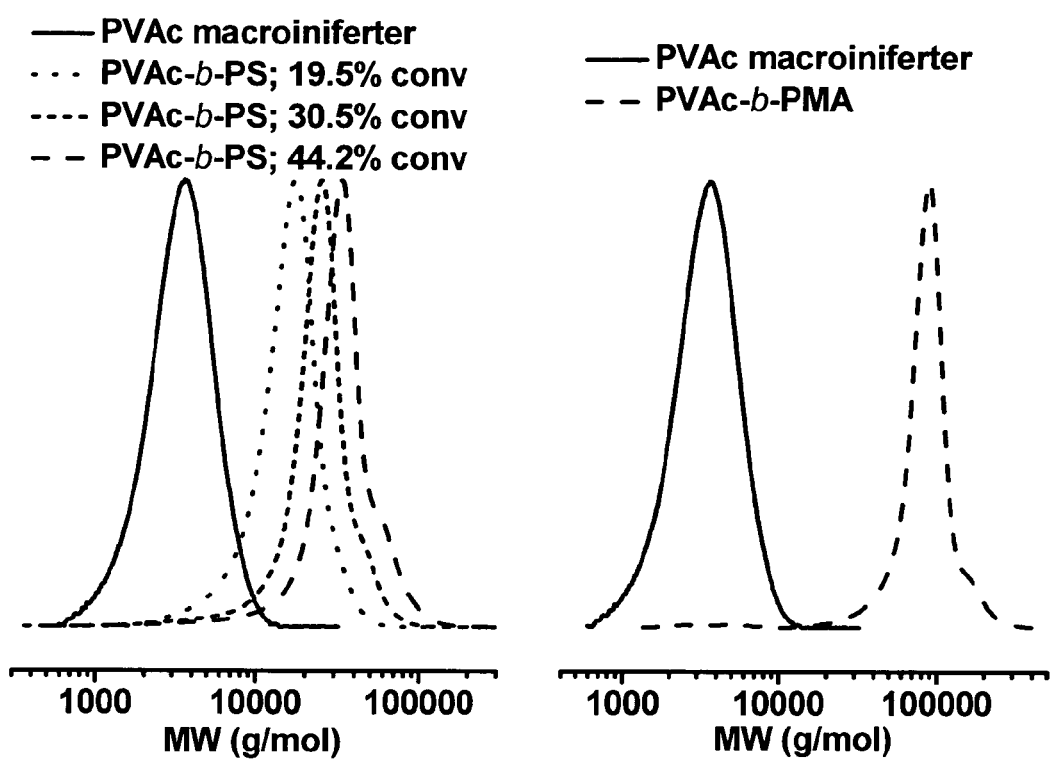
FIG. 10. Evolution of SEC traces during ATRP of styrene with a PVAc macroinitiator (left) and SEC trace of PVAc-b-PMA block copolymer prepared by ATRP of MA with a PVAc macroinitiator (right).

FIG. 10 shows the evolution of SEC traces during ATRP of styrene with a PVAc macroinitiator (left) and SEC trace of PVAc-b-PMA block copolymer prepared by ATRP of MA with a PVAc macroinitiator (right). There is a clean shift of the curves to higher molecular weight.

Example 5e

ATRP of MMA with PVAc Macroiniferter

| M | M/PVAc/Cu0/ CuBr/CuBr2/L[a] | L | Conv (%) | $M_{nth}$ | $M_{nexp}$ | $M_w/M_n$ |
|---|---|---|---|---|---|---|
| MMA[b] | 560/1/0/1/0.1/2.2 | bpy | 66.4 | 40,600 | 57,500[c] | 1.32 |
| MMA[d] | 560/1/0/1.8/0.2/4[e] | bpy | 76.2 | 46,100 | 54,900[f] | 1.24 |

[a]PVAc: Mn = 2,950 g/mol and Mw/Mn = 1.26;
[b]MMA/DMF = 1/1 v/v, 50° C., 22 h;
[c]after precipitation in methanol (before precipitation, Mn = 45,300 g/mol and Mw/Mn = 1.62);
[d]MMA/DMF = 1/1 v/v, 50° C., 24 h;
[e]CuCl and CuCl2 were used instead of CuBr and CuBr2;
[f]after precipitation in methanol (before precipitation, Mn = 50,500 g/mol and Mw/Mn = 1.34).

Block copolymers with well defined segments were prepared using both approaches.

Example 6

One Pot CTA Synthesis by ATRAF and TMMCTAP of MMA

Ratio of Reagents

| | MW | d | mmol | mass (mg) | vol (mL) |
|---|---|---|---|---|---|
| Ethyl α-bromophenylacetate | 243.10 | 1.389 | 0.114 | 27.8 | $20 * 10^{-3}$ |
| bis(thiobenzoyl) disulfide | 306.49 | — | 0.0571 | 17.5 | |
| CuBr | 143.45 | | 0.0285 | 4.1 | |
| PMDETA | 173.3 | 0.829 | 0.0429 | 7.4 | $9 * 10^{-3}$ |
| Cu[0] | 63.55 | — | 0.171 | 10.9 | |
| MMA | 100.12 | 0.936 | 46.9 | $4.69 * 10^3$ | 5 |
| Anisole | | | | | 1 + 4 |

Ratio of reagents:
[EBPA]/[Disulfide]/[CuBr]/[PMDETA]/[Cu[0]]/[MMA] = 2/1/0.5/0.75/3/820 in anisole 50% in volume.

MMA was purified by passing through a basic alumina column and then bubbled with $N_2$ for 30 minutes. The solvent anisole was bubbled with $N_2$ for 30 minutes.

A flask was charged with bis(thiobenzoyl) disulfide (17.5 mg, $5.71 \times 10^{-2}$ mmol), Cu[0] (10.9 mg, $1.71 \times 10^{-1}$ mmol), CuBr (4.1 mg, $2.85 \times 10^{-2}$ mmol) was purged with $N_2$ for 30 minutes. Anisole (1 mL) and PMDETA ($9 \times 10^{-3}$ mL, $4.29 * 10^{-2}$ mmol) were added. After 10 min ethyl α-bromophenylacetate ($20 \times 10^{-3}$ mL, 0.114 mmol) was introduced and the flask was placed in an oil bath thermostated at 80° C. After 45 min MMA (5 mL, 46.9 mmol) and anisole (4 mL) were added and a sample was taken for ulterior conversion monitoring. The solution was subsequently stirred at 80° C. for 21 hours 30.

Conversion=79.2%; $M_{nth}$=32,800 g/mol; $M_n$=40,400 g/mol; $M_w/M_n$=1.14 A linear relationship between $\ln([M]_o/[M]_t)$ versus time was observed indicating no detectable termination reactions occurred and the GPC curves moved cleanly to higher molecular weight with no sign of tailing or coupling.

We claim:

1. A transition metal mediated controlled chain transfer agent polymerization process comprising polymerizing radically (co)polymerizable monomer(s) by a controlled chain transfer agent polymerization process in the presence of:
   an initiator comprising substituted dithio-groups selected from the group consisting of dithioesters, dithiobenzoates, dithiocarbamates, trithiocarbonates and xanthates, substituted with various alkyl substituents;
   a transition metal compound; and
   a ligand;
   wherein the resulting (co)polymer has a polydispersity of less than 1.5; and
   wherein the initiator comprising substituted dithio-groups are formed by reaction of one of a dithioester disulfide, a dithiobenzoate disulfide, a dithiocarbamate disulfide, a trithiocarbonate, and a xanthate disulfide in the presence of:
   an alkyl halide, optionally comprising functional groups;
   a transition metal catalyst; and
   a ligand.

2. A transition metal mediated controlled chain transfer agent polymerization process comprising polymerizing radically (co)polymerizable monomer(s) by a controlled chain transfer agent polymerization process in the presence of:
   an initiator comprising substituted dithio-groups selected from the group consisting of dithioesters, dithiobenzoates, dithiocarbamates, trithiocarbonates and xanthates, substituted with various alkyl substituents;
   a transition metal compound; and
   a ligand;
   wherein the resulting (co)polymer has a polydispersity of less than 1.5; and
   wherein the initiator comprising substituted dithio-groups additionally comprises one or more different radically transferable atoms or groups.

3. The polymerization process of claim 2, wherein the initiator comprising substituted dithio-groups is initially employed to conduct a transition metal mediated controlled polymerization process comprising initiating the polymerization of first radically copolymerizable monomers by activating the substituted dithio-groups in the presence of:
   a transition metal complex; and
   a ligand, followed by conducting a second controlled polymerization process of one or more different monomers using the one or more different radically transferable atoms or groups as the initiating functionality.

4. The polymerization process of claim 2, wherein the initiator comprising one or more different radically transferable atoms or groups is initially employed to conduct a transition metal mediated controlled polymerization process comprising polymerization of first radically copolymerizable monomers using the radically transferable atoms or groups as the initiating functionality in the presence of:

a transition metal complex; and a ligand, followed by conducting a second transition metal mediated controlled polymerization process of one or more different monomers by activating the substituted dithio-groups to initiate the polymerization.

5. The polymerization process of claim 2, wherein the initiator comprising dithio-groups and one or more different radically transferable atoms or groups is employed for concurrently conducting a transition metal mediated controlled polymerization of a first set of radically (co)polymerizable monomers wherein the radically transferable atoms or groups is the initiating functionality to conduct the transition metal mediated controlled polymerization process; and polymerizing a second set of radically (co)polymerizable monomers, wherein the substituted dithio-group is used to initiate a transition metal mediated controlled polymerization in the presence of a transition metal complex and a ligand.

6. A process for the preparation of a chain transfer agent or initiator containing a dithio-group selected from dithiobenzoate, dithiocarbamate, and xanthate with various alkyl substituents comprising:

conducting a transition metal mediated addition fragmentation reaction with one of a bis(thiobenzoyl) disulfide, a bis(ethylxanthogen) and a tetraethylthiuram disulfide in the presence of an alkyl halide and about 0.05 equivalents of a transition metal catalyst complex capable of a conducting an activation/deactivation reaction.

7. The process of claim 6, wherein the reaction is conducted in the presence of a reducing agent.

8. The process of claim 6, wherein the alkyl halide is a macromolecule.

9. The process of claim 8, wherein the alkyl halide macromolecule is formed by a first copolymerization of radically copolymerizable monomers in the presence of a transition metal complex capable of a conducting an activation/deactivation reaction with an added alkyl halide.

10. A controlled polymerization process comprising polymerizing radically copolymerizable monomers in the presence of:

a dithio-chain transfer agent;

a transition metal compound;

a ligand that forms a soluble complex with the transition metal compound; and a reducing agent wherein the final copolymer has a degree of polymerization greater than 1,000 and a polydispersity less than 1.5.

11. The process of claim 10 wherein the final copolymer has a degree of polymerization greater than 10,000 and a polydispersity less than 1.3.

* * * * *